United States Patent

Nakagawa et al.

[11] Patent Number: 5,838,378
[45] Date of Patent: Nov. 17, 1998

[54] MOVING IMAGE CODING APPARATUS MOVING IMAGE DECODING APPARATUS AND MOVING CODING-DECODING APPARATUS

[75] Inventors: Akira Nakagawa; Kimihiko Kazui; Eishi Morimatsu, all of Kawasaki, Japan

[73] Assignee: Fujitsu Limited, Kawasaki, Japan

[21] Appl. No.: 729,303

[22] Filed: Oct. 10, 1996

[30] Foreign Application Priority Data

Jan. 11, 1996 [JP] Japan .................................. 8-003423

[51] Int. Cl.⁶ ..................................................... H04N 7/50
[52] U.S. Cl. ........................... 348/401; 348/402; 382/248
[58] Field of Search ................... 348/401, 402, 348/400, 403, 404, 406, 407; 382/248; H04N 7/50

[56] References Cited

U.S. PATENT DOCUMENTS

| 4,224,678 | 9/1980 | Lynch | 348/403 |
| 5,005,082 | 4/1991 | Zdepski | 348/620 |
| 5,313,298 | 5/1994 | Meeker | 348/405 |

FOREIGN PATENT DOCUMENTS 62-910090   4/1987   Japan ................................ H04N 7/13

Primary Examiner—Howard Britton
Attorney, Agent, or Firm—Staas & Halsey

[57] ABSTRACT

A moving image coding apparatus, a moving image decoding apparatus and a moving image coding-decoding apparatus suitable for use when a moving image is compressed and transmitted have a prediction error signal generating means for dividing an inputted image into blocks each consisting of plural pixels and computing a difference between the inputted image and a predicted image generated from a past inputted image to generate a prediction error signal, an amplitude modulating means for conducting amplitude modulation on an amplitude of each pixel of the prediction error signal at a predetermined modulation factor, a transforming means for transforming the prediction error signal having been undergone amplitude modulation in order to remove correlation among the pixels to generate a transform coefficient, a quantizing means for quantizing the generated transform coefficient, and a channel coding means for assigning a code to the quantized transform coefficient and outputting it, whereby a visually prominent error can be decreased over an entire block when the moving image is coded and decoded.

20 Claims, 11 Drawing Sheets

BLOCK

NEIGHBOURING PIXELS FOR DETERMINING AN ACTIVITY

TREAMENT OF PIXELS IN THE VICINITY
OF A BLOCK BOUNDAY

BLOCK BOUNDARY

NEIGHBOURING PIXELS FOR DETERMINING AN ERROR VISIBILITY

OBJECT PIXEL: Xi1

TREATMENT OF PIXELS IN THE VICINITY OF A BLOCK BOUNDARY

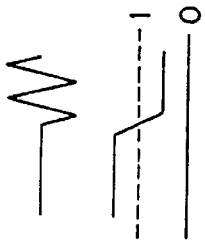
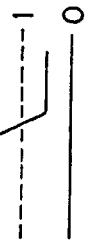
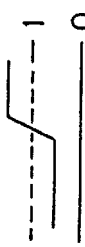
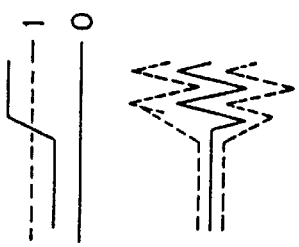

FIG.7(a) PREDICTION ERROR SIGNAL

FIG.7(b) AMPLITUDE MODULATION FACTOR

FIG.7(c) PREDICTION ERROR SIGNAL UNDERGONE AMPLITUDE MODULATION

FIG.7(d) PREDICTION ERROR SIGNAL UNDERGONE AMPLITUDE MODULATION, ORTHOGONAL TRANSFORM, QUANTIZATION, DEQUANTIZAION AND INVERSE ORTHOGONAL TRANSFORM

FIG.7(e) CODING NOISE IN THE PREDICTION ERROR SIGNAL UNDERGONE AMPLITUDE MODULATION

FIG.7(f) AMPLITUDE DEMODULATION FACTOR

FIG.7(g) PREDICTION ERROR SIGNAL UNDERGONE AMPLITUDE DEMODULATION

FIG.7(h) CODING NOSE IN THE PREDICTION ERROR SIGNAL UNDERGONE AMPLITUDE DEMODULATION

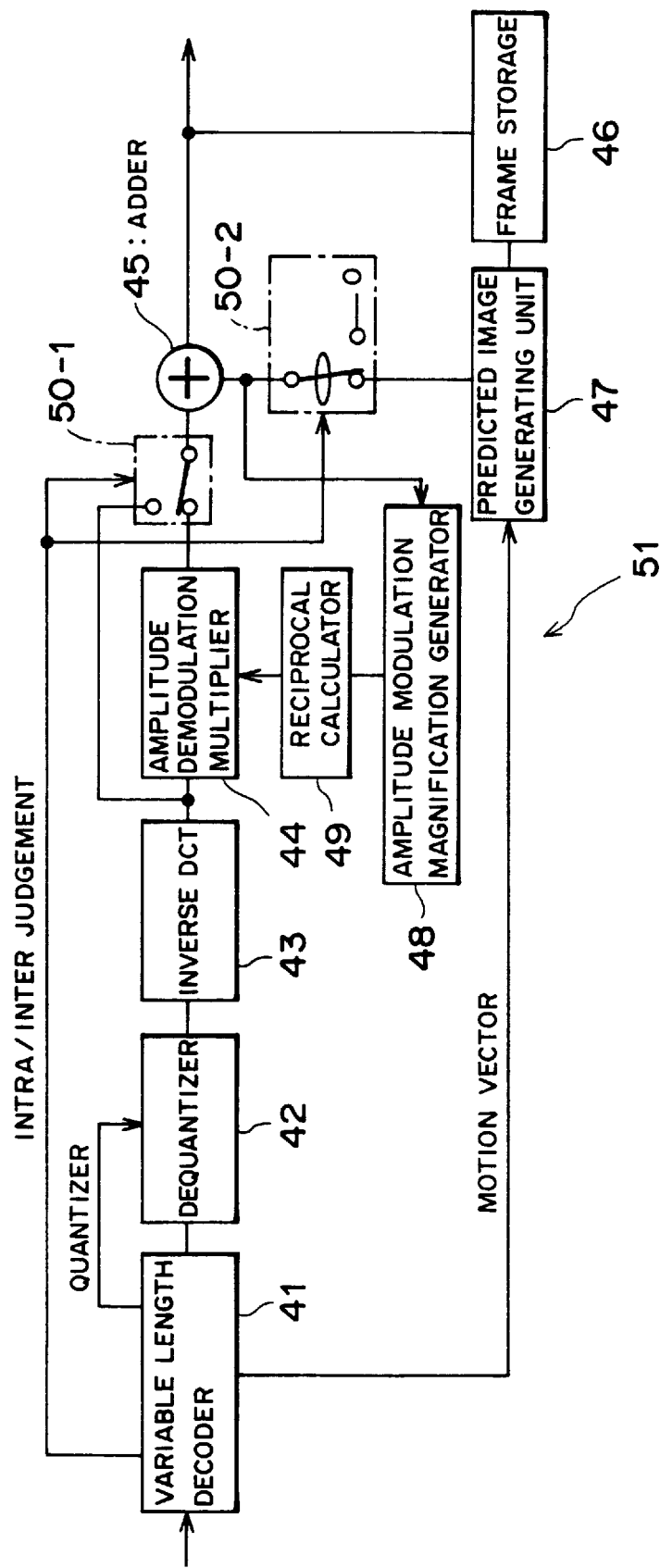

FIG.11(a) PREDICTION ERROR SIGNAL
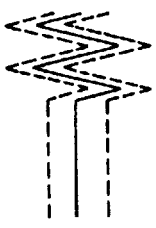
FIG.11(b) PREDICTION ERROR SIGNAL UNDERGONE ORTHOGONAL TRANSFORM, QUANTIZATION, DEQUANTIZATION AND INVERSE ORTHOGONAL TRANSFORM
FIG.11(c) CODING NOISE IN THE DECODED PREDICTION ERROR SIGNAL

MOVING IMAGE CODING APPARATUS MOVING IMAGE DECODING APPARATUS AND MOVING CODING-DECODING APPARATUS

BACKGROUND OF THE INVENTION

The present invention relates to a moving image coding apparatus, a moving image decoding apparatus and a moving image coding-decoding apparatus suitable for use when moving image information is compressed and transmitted.

Digital image data has, in general, enormous information as compared with sound data. If digital image data is transmitted, it is required to transmit the digital image data in a smaller information quantity with a smaller visual distortion as much as possible by using a data compressing technique.

To meet the above requirements, researches in image encoding techniques for data compression or moving image decoding techniques for data regeneration are widely made in recent years. For example, there are widely known H. 261, MPEG-1/2 (Motion Picture Image Coding Experts Group) and the like as standard systems of the above-mentioned digital image coding system.

FIG. 9 is a block diagram showing a moving image coding apparatus on the basis of the above-mentioned standard system. In the moving image encoding apparatus 100 shown in FIG. 9, reference numeral 101 denotes a prediction error signal generating unit. The prediction error signal generating unit 101 calculates a difference between an inputted image and a predicted image generated from a past inputted image by the prediction error signal generating unit 110 for each N×N (N=8, for example) block to generate a prediction error signal.

Reference numeral 102 denotes a transforming unit. The transforming unit 102 conducts an orthogonal transform such as a two-dimensional DCT (Discrete Cosine Transform) or the like on the prediction error signal from the prediction error signal generating unit 101 as a transform useful to remove correlation among pixels.

Further, reference numeral 103 denotes a quantizer for quantizing a transform coefficient from the transforming unit 102. Reference numeral 104 denotes a dequantizer for dequantizing the quantized transform coefficient from the quantizer 103. Reference numeral 105 denotes an inverse transforming unit for inversely transforming the transform coefficient from the dequantizer 104 to generate the prediction error signal before the transform.

Reference numeral 106 denotes a decoded image generating unit for adding the prediction error signal from the inverse transforming unit 105 to a predicted image generated from the past inputted image to generate a decoded image. Reference numeral 107 denotes a storing unit for storing the decoded image from the decoded image generating unit 106 as image information used to generate a predicted image on the next occasion and after.

Further, reference numeral 108 denotes a prediction parameter calculating unit. The prediction parameter calculating unit 108 calculates a parameter used to generate the above-mentioned predicted image on the basis of the inputted image and image information from the decoded image storing unit 107.

Reference numeral 109 denotes a predicted image generating unit. The predicted image generating unit 109 generates the above-mentioned predicted image on the basis of the image information from the decoded image storing unit 107 and the prediction parameter from the prediction parameter calculating unit 108.

Still further, reference numeral 110 denotes a channel coding unit. The channel coding unit 110 for conducting channel-coding on information as to quantization, control information such as the prediction parameter calculated by the prediction parameter calculating unit 108 and the like along with the quantized transform coefficient from the above-mentioned quantizing unit 103, and outputs them as moving image coded information.

FIG. 10 is a block diagram showing a moving image decoding apparatus on the basis of the above-mentioned standard system. In the moving image decoding apparatus 117 shown in FIG. 10, reference numeral 111 denotes a channel code decoding unit. The channel code decoding unit 111 decodes the moving image coded information from the moving image coding apparatus to decode the information as to quantization, the control information such as the prediction parameter and the like along with the quantized transform coefficient from the channel coding unit 110 in, for example, the above-mentioned moving image coding apparatus 110.

Reference numeral 112 denotes a dequantizer for dequantizing the quantized transform coefficient from the channel code decoding unit 111 on the basis of the decoded information as to quantization. Reference numeral 113 denotes an inverse transforming unit for inversely transforming the transform coefficient from the dequantizer 104 to regenerate the prediction error signal before the transform.

Reference numeral 114 is a decoded image regenerating unit for adding the prediction error signal from the inverse transforming unit 113 to a predicted image generated from a past inputted image to generate a decoded image. Reference numeral 115 denotes a storing unit for storing the decoded image from the decoded image generating unit 114 as image information used to generate a predicted image on and after the next occasion.

Further, reference numeral 116 denotes a predicted image generating unit. The predicted image generating unit 116 generates the above-mentioned predicted image on the basis of the image information from the decoded image storing unit 115 and the prediction parameter decoded in the channel code decoding unit 111.

In the coding apparatus with the above structure shown in FIG. 9, the prediction error signal generating unit 101 calculates a prediction error for an inputted image for each N×N block on the basis of a predicted image generated by the predicted image generating unit 109.

Following that, the transforming unit 102 conducts a discrete cosine transform that is an orthogonal transform on the prediction error calculated for each N×N block, then the quantizer 103 quantizes a result of the transform. An output from the quantizer 103 is coded by the channel coding unit 110 and outputted. The output from the quantizer 103 is, on the other hand, outputted to the dequantizer 104 to be used as a signal used to generate a predicted image for an inputted image in the next stage.

Namely, the dequantizer 104 dequantizes a quantized coefficient from the quantizer 103, the inverse transforming unit 105 then conducts inverse discrete cosine transform on a transform coefficient.

The decoded image generating unit 106 adds the prediction error signal after transform from the inverse transforming unit 105 to the predicted image generated by the predicted image generating unit 109 to generate a decoded image. The decoded image storing unit 115 stores the decoded image generated by the decoded image generating unit 114 in order to generate a predicted image in the next stage.

Incidentally, the predicted image generating unit 109 generates the above-mentioned predicted image on the basis of the decoded image from the decoded image storing unit 107 and the prediction parameter calculated by the prediction parameter calculating unit 108.

The decoding apparatus shown in FIG. 10 decodes a channel code inputted to the channel code decoding unit 111 to determine the information so as to quantization, the control information such as the prediction parameter and the like along with the quantized transform coefficient. After that, the dequantizer 112 dequantizes the quantized coefficient, the inverse transforming unit 113 then conducts inverse discrete cosine transform on the transform coefficient.

The decoded image generating unit 114 adds the prediction error signal transformed from the inverse transforming unit 113 to the predicted image generated by the predicted image generating unit 116 to generate a decoded image. Incidentally, the decoded image generated by the decoded image generating unit 114 is stored in the decoded image storing unit 115 in order to generate a decoded image on the basis of a prediction error signal in the next stage.

However, in the above-described moving image coding apparatus 100 shown in FIG. 9, quantization by the quantizer 103 is conducted on a coefficient having been undergone orthogonal transform (a discrete cosine transform) by the transforming unit 102.

Meanwhile, a coefficient as a result of the transform by the transforming unit 102 approximately corresponds to a frequency of an image in a corresponding block. Therefore, a quantization error generated when a certain coefficient is quantized is added as a coding error to all pixels within a block at an approximately certain power when an inverse orthogonal transform (an inverse discrete cosine transform) is conducted. This error causes an prominent visual error due to the human visual sensitivity.

Namely, if both a relatively flat region and a complex region, or a difference in luminance exists within a block to be coded, the high-frequency coding noises (mosquito noises) generated when high-frequency components are quantized applied to the flat region in which high-frequency components do not exist in nature are prominent much more than the coding noises of similar characteristics applied on the complex region.

In concrete, as shown by solid line in FIG. 11(*a*), when orthogonal transform and a quantizing process are conducted on a prediction error signal in a certain block generated by the prediction error signal generating unit 101 if there exist a relatively flat region (a low-frequency region) and a complex region (a high-frequency region), an error is generated in the prediction error signal as shown by dotted line in FIG. 11(*b*).

If the above-mentioned prediction error signal having been undergone the orthogonal transform and the quantizing process is decoded, an error is uniformly generated in both the flat region and the complex region as shown in FIG. 11(*c*). In other words, high-frequency coding noises (mosquito noises) are generated due to quantization of high-frequency components even in the flat part in which no high-frequency components exist. The high-frequency coding noises are prominent much more than coding noises of similar characteristics applied in the complex region due to the human visual sensitivity.

In Japanese Patent Laid-Open Publication No. 62-91090, there is disclosed a technique which enables transform coding with less blur in a part of block boundary by conducting a process of emphasizing the boundary part of a block in a stage preceding to the transform coding on the divided image signal block.

However, the above-mentioned technique disclosed in Japanese Patent Laid-Open Publication No. 62-91090 merely diminishes only errors in a block boundary, but cannot diminish visually prominent errors over an entire block such as a flat part or the like.

SUMMARY OF THE INVENTION

In the light of the above problem, an object of the present invention is to provide a moving image coding apparatus, a moving image decoding apparatus and a moving image coding-decoding apparatus which can diminish visually prominent errors over an entire block when a moving image is coded and encoded.

The present invention therefore provides a moving image coding apparatus comprising a prediction error signal generating means for dividing an inputted image into blocks each consisting of plural pixels, and computing a difference between the inputted image and a predicted image generated from a past inputted image for each block to generate a prediction error signal, an amplitude modulating means for conducting amplitude modulation on an amplitude of each pixel of the prediction error signal generated by the prediction error signal generating means at a predetermined modulation factor, a transforming means for transforming the prediction error signal having been undergone the amplitude modulation in the amplitude modulating means in order to remove correlation among the pixels to generate a transform coefficient, a quantizing means for quantizing the transform coefficient from the transforming means, a dequantizing means for dequantizing a quantized transform coefficient from the quantizing means to regenerate the transform coefficient, an inverse transforming means for regenerating the prediction error signal having been undergone the amplitude modulation on the basis of the regenerated transform coefficient, an amplitude demodulating means for demodulating an amplitude of each pixel of the prediction error signal from the inverse transforming means at a predetermined demodulation factor to regenerate the prediction error signal, a decoded image generating means for adding the prediction error signal regenerated by the amplitude demodulating means to the predicted image to generate a decoded image, a decoded image storing means for storing the decoded image from the decoded image generating means as a decoded image decoded in the past, a prediction parameter calculating means calculating a prediction parameter used to generate the predicted image from the decoded image stored in the decoded image storing means such that an error between the decoded image and an inputted image inputted following the decoded image is decreased, a predicted image generating means for generating the predicted image from the prediction parameter calculated by the prediction parameter calculating means and the decoded image stored in the decoded image storing means, and a channel coding means for assigning codes to control information along with the quantized transform coefficient from the quantizing means to output the codes as moving image coded information.

According to this invention, the amplitude modulating means conducts amplitude modulation on an amplitude of each pixel of the prediction error signal generated by the prediction error signal generating means at a predetermined modulation factor, and the amplitude demodulating means demodulates an amplitude of each pixel of the prediction error signal from the inverse transforming means at a predetermined demodulation factor to regenerate the prediction error signal. It is therefore possible to conduct a coding process which can decrease visually prominent errors over an entire block when a moving image is regenerated so that a visually fine image can be transmitted. This feature contributes to improvement in performance of the moving image coding apparatus.

The present invention also provides a moving image coding apparatus comprising a prediction error signal generating means for dividing an inputted image into blocks each consisting of plural pixels, and computing a difference between the inputted image and a predicted image generated from a past inputted image for each block to generate a prediction error signal, an amplitude modulating means for conducting amplitude modulation on an amplitude of each pixel of the prediction error signal generated by the prediction error signal generating means at a predetermined modulation factor, a first switching means for selectively switching to either the prediction error signal from the prediction error signal generating means or the prediction error signal having been undergone the amplitude modulation by the amplitude modulating means and outputting it, a transforming means for transforming the prediction error signal from the first switching means in order to remove correlation among the pixels to generate a transform coefficient, a quantizing means for quantizing the transform coefficient from the transforming means, a dequantizing means for dequantizing the quantized transform coefficient from the quantizing means to regenerate the transform coefficient, an inverse transforming means for regenerating the prediction error signal having been undergone the amplitude modulation on the basis of the regenerated transform coefficient, an amplitude demodulating means for demodulating an amplitude of each pixel of the prediction error signal from the inverse transforming means at a predetermined demodulation factor to regenerate the prediction error signal, a second switching means for selectively switching to either the prediction error signal regenerated by the inverse transforming means or the prediction error signal having been undergone the amplitude demodulation by the amplitude demodulating means and outputting it, a decoded image generating means for adding the prediction error signal from the second switching means to the predicted image to generate a decoded image, a decoded image storing means for storing the decoded image from the decoded image generating means as a decoded image decoded in the past, a prediction parameter calculating means for calculating a prediction parameter used to generate the predicted image from the decoded image stored in the decoded image storing means such that an error between the decoded image and an inputted image inputted following the decoded image is decreased, a predicted image generating means for generating the predicted image from the prediction parameter calculated by the prediction parameter calculating means and the decoded image stored in the decoded image storing means to generate the predicted image, a channel coding means for assigning codes to control information along with the quantized transform coefficient from the quantizing means and outputting them as moving image coded information, a third switching means for selectively switching to either the predicted image generated by the predicted image generating means or a signal representing that there is no predicted image and outputting it to the prediction error signal generating means and the decoded image generating means, and a first control means for controlling switching of each of the switching means according to the block.

According to this invention, the amplitude modulating means conducts amplitude modulation on an amplitude of each pixel of the prediction error signal generated by the prediction error signal generating means at a predetermined modulation factor, and the amplitude demodulating means demodulates an amplitude of each pixel of the prediction error signal from the inverse transforming means at a predetermined demodulation factor to regenerate the prediction error signal. It is therefore possible to conduct a coding process which can decrease visually prominent errors over an entire block when a moving image is regenerated so that a visually fine image can be transmitted. This feature contributes to improvement in performance of the moving image coding apparatus.

Further, owing to the first switching means, the second switching means, the third switching means and the first control means, it is possible to adaptively select a mode of intraframe coding or interframe coding according to a block. This feature enables an efficient compression coding according to a block.

The present invention also provides a moving image decoding apparatus comprising a channel code decoding means for decoding quantized transform coefficient and control information constituting moving image coded information from a moving image coding apparatus to regenerate them, a dequantizing means for dequantizing the quantized transform coefficient regenerated by the channel code decoding means to regenerate a transform coefficient, an inverse transforming means for regenerating a prediction error signal having been undergone amplitude modulation on the basis of the regenerated transform coefficient, an amplitude demodulating means for demodulating an amplitude of each pixel of the modulated prediction error signal from the inverse transforming means at a predetermined demodulation factor to regenerate a prediction error signal, a decoded image generating means for adding the prediction error signal regenerated by the amplitude demodulating means to a predicted image generated from a past inputted image to generate a decoded image, a decoded image storing means for storing the decoded image from the decoded image generating means as a decoded image decoded in the past, and a predicted image generating means for generating the predicted image from the control information regenerated by the channel code decoding means and the decoded image stored in the decoded image storing means.

According to this invention, the amplitude demodulating means may demodulate an amplitude of each pixel of the modulated prediction error signal from the inverse transforming means at a predetermined demodulation factor. If a moving image modulated in coding is received, it is possible to regenerate a fine image in which visually prominent errors have been decreased over an entire block. This feature contributes to improvement in performance of the apparatus.

The present invention also provides a moving image decoding apparatus comprising a channel code decoding means for decoding quantized transform coefficient and control information constituting moving image coded information from a moving image coding apparatus to regenerate them, a dequantizing means for dequantizing the quantized transform coefficient regenerated by the channel code decoding means to regenerate a transform coefficient, an inverse transforming means for regenerating a prediction error signal having been undergone amplitude modulation on the basis of the regenerated transform coefficient, an amplitude demodulating means for demodulating an amplitude of each pixel of the modulated prediction error signal from the inverse transforming means at a predetermined demodulation factor to regenerate a prediction error signal, a fourth switching means for selectively switching to either the prediction error signal regenerated by the inverse transforming means or the prediction error signal having been undergone amplitude demodulation by the amplitude demodulating means and outputting it to a decoded image generating means, the decoded image generating means for adding the predicted error signal from the fourth switching means to a predicted image generated from a past inputted image to generate a decoded image, a decoded image storing means for storing the decoded image from the decoded image generating means as a decoded image decoded in the past, a predicted image generating means for generating the predicted image from the control information regenerated by the channel code decoding means and the decoded image stored in the decoded image storing means, a fifth switching means for selectively switching to either the predicted image generated by the predicted image generating means or a signal representing that there is no predicted image and outputting it to the decoded image generating means, and a second control means for controlling switching of each of the switching means according to the block.

According to this invention, the amplitude demodulating means may demodulate an amplitude of each pixel of the modulated prediction error signal from the inverse transforming means at a predetermined demodulation factor. If a moving image modulated in coding is received, it is possible to regenerate a fine image in which visually prominent errors have been decreased over an entire block. This feature contributes to improvement of the performance of the apparatus.

The present invention also provides a moving image coding-decoding apparatus comprising a moving image coding unit comprising a prediction error signal generating means for dividing an inputted image into blocks each consisting of plural pixels, and computing a difference between the inputted image and a predicted image generated from a past inputted image for each block to generate a prediction error signal, an amplitude modulating means for conducting amplitude modulation on an amplitude of each pixel of the prediction error signal generated by the prediction error signal generating means at a predetermined modulation factor, a transforming means for transforming the prediction error signal having been undergone the amplitude modulation in the amplitude modulating means in order to remove correlation among the pixels to generate a transform coefficient, a quantizing means for quantizing the transform coefficient from the transforming means, a dequantizing means for dequantizing the quantized transform coefficient from the quantizing means to regenerate the transform coefficient, an inverse transforming means for regenerating the predicted error signal having been undergone the amplitude modulation on the basis of the regenerated transform coefficient, an amplitude demodulating means for demodulating an amplitude of each pixel of the prediction error signal from the inverse transforming means at a predetermined demodulation factor to regenerate the prediction error signal, a decoded image generating means for adding the prediction error signal regenerated by the amplitude demodulating means to the predicted image to generate a decoded image, a decoded image storing means for storing the decoded image from the decoded image generating means as a decoded image decoded in the past, a prediction parameter calculating means for calculating a prediction parameter used to generate the predicted image from the decoded image stored in the decoded image storing means such that an error between the decoded image and an inputted image inputted following the decoded image is decreased, a predicted image generating means for generating the predicted image from the prediction parameter calculated by the prediction parameter calculating means and the decoded image stored in the decoded image storing means, a channel coding means for assigning codes to control information along with the quantized transform coefficient from the quantizing means to output the codes as moving image coded information, a moving image decoding unit comprising a channel code decoding means for decoding a quantized transform coefficient and control information constituting moving image coded information from a moving image coding apparatus to regenerate them, a dequantizing means for dequantizing the quantized transform coefficient regenerated by the channel code decoding means to regenerate a transform coefficient, an inverse transforming means for regenerating the prediction error signal having been undergone the amplitude modulation on the basis of the regenerated transform coefficient, an amplitude demodulating means for demodulating an amplitude of each pixel of the modulated prediction error signal from the inverse transforming means at a predetermined demodulation factor to regenerate the prediction error signal, a decoded image generating means for adding the prediction error signal regenerated by the amplitude demodulating means to a predicted image generated from a past inputted image to generate a decoded image, a decoded image storing means for storing the decoded image from the decoded image generating means as a decoded image decoded in the past, and a predicted image generating means for generating the predicted image from the control information regenerated by the channel code decoding means and the decoded image stored in the decoded image storing means.

According to this invention, the amplitude demodulating means may demodulate an amplitude of each pixel of the modulated prediction error signal from the inverse transforming means at a predetermined demodulation factor. If a moving image modulated in coding is received, it is possible to regenerate a fine image in which visually prominent errors have been decreased over an entire block. This feature contributes to improvement of the performance of the apparatus.

BRIEF DESCRIPTION OF THE DRAWINGS

FIGS. 4(a) through 4 (c) are diagrams for illustrating a manner of calculating a modulation/demodulation factor for a prediction error signal according to the embodiment;

FIGS. 7(a) through 7(h) are diagrams for illustrating operations of a moving image coding apparatus and a moving image decoding apparatus according to the embodiment;

FIG. 8 is a block diagram showing the moving image decoding apparatus according to the embodiment of this invention;

FIGS. 11(a) through 11(c) are diagrams for illustrating operations of the moving image coding apparatus and the moving image decoding apparatus based on the standard system.

DESCRIPTION OF THE PREFERRED EMBODIMENTS (a) Description of Aspects of the Invention Now, description will be made of aspects of the present invention with reference to the drawings.

Figure 1:
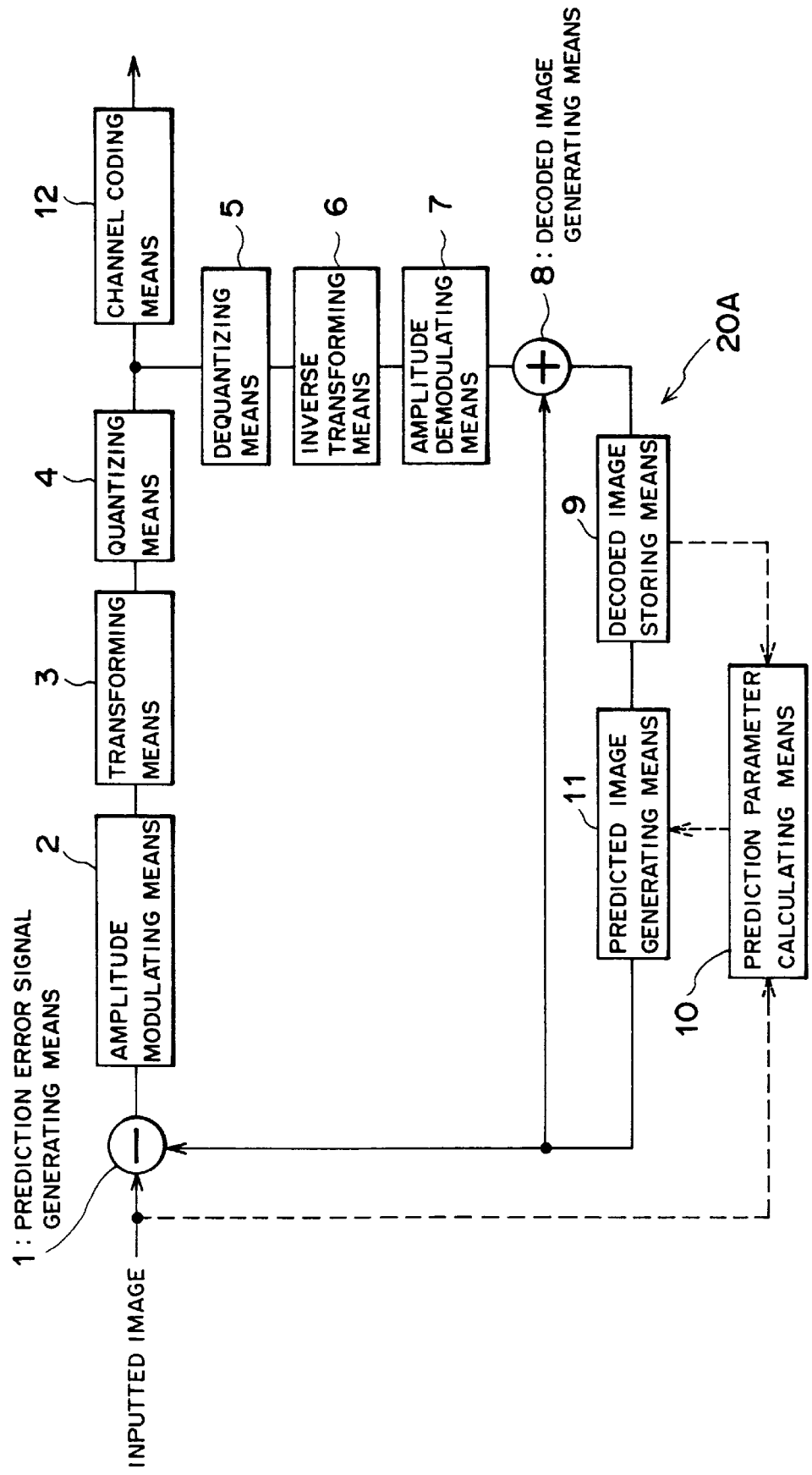
FIGS. 1 and 2 are block diagrams showing aspects of this invention.

FIG. 1 is a block diagram showing an aspect of this invention. A moving image coding apparatus 20A shown in FIG. 1 has a prediction error signal generating means 1, an amplitude modulating means 2, a transforming means 3, a quantizing means 4, a dequantizing means 5, an inverse transforming means 6, an amplitude demodulating means 7, a decoded image generating means 8, a decoded image storing means 9, a prediction parameter calculating means 10, a predicted image generating means 11 and a channel coding means 12.

The prediction error signal generating means 1 divides an inputted image into blocks each consisting of plural pixels, and computes a difference between the inputted image and a predicted image generated from a past inputted image to generate a prediction error signal.

The amplitude modulating means 2 conducts amplitude modulation on an amplitude of each pixel of the predicted error signal generated by the prediction error signal generating means 1 at a predetermined modulation factor. The transforming means 3 transforms the predicted error signal having been undergone amplitude modulation by the amplitude modulating means 2 in order to remove correlation among pixels to generate a transform coefficient. The quantizing means 4 quantizes the transform coefficient form the transforming means 3.

The dequantizing means 5 dequantizing the quantized transform coefficient from the quantizing means 4 to regenerate the transform coefficient. The inverse transforming means 6 regenerates the predicted error signal having been undergone amplitude modulation on the basis of the regenerated transform coefficient. The amplitude demodulating means 7 demodulates an amplitude of each pixel of the predicted error signal from the inverse transforming means 6 at a predetermined demodulation factor to regenerate the prediction error signal.

The decoded image generating means 8 adds the prediction error signal regenerated by the amplitude demodulating means 7 to the predicted image to generate a decoded image. The decoded image storing means 9 stores therein the decoded image from the decoded image generating means 8 as a decoded image decoded in the past.

The prediction parameter calculating means 10 calculates a prediction parameter used to generate a predicted image from the decoded image stored in the decoded image storing means 9 such that an error between the decoded image and an inputted image inputted following the decoded image is decreased. The predicted image generating means 11 generates a predicted image from the prediction parameter calculated by the prediction parameter calculating means 10 and the decoded image stored in the decoded image storing means 9.

The channel coding means 12 assigns codes to control information along with the quantized transform coefficient from the quantizing means 4, and outputs them as moving image coded information.

The moving image coding apparatus 21A may have a modulation factor setting means for setting, as a modulation factor of the amplitude modulating means 2, a magnification relatively increasing the prediction error signal to a pixel at which an error generated as a result of coding in a block is desired to be decreased, while setting, as a modulation factor of the amplitude modulating means 2, a magnification relatively decreasing the prediction error signal to a pixel at which an error generated as a result of coding in a block can be permitted even if the error is large.

In which case, the modulation factor of the prediction error signal set by the modulation factor setting means may be determined in an image within the block on the basis of a scale reflecting the human visual sensitivity.

In concrete, the modulation factor setting means may set a relatively large magnification to a value of the prediction error signal of a pixel judged that an error at which is apt to be seen on the scale as the modulation factor for the prediction error signal in the amplitude modulating means 2, while setting a relatively small magnification to a value of the prediction error signal of a pixel judged that an error at which is apt to be inconspicuous on the scale.

The modulating factor setting means may determine the scale on the basis of the predicted image from the predicted image generating means 11.

The moving image coding apparatus 20A may further has a demodulation factor setting means for setting a demodulation factor in the amplitude demodulating means such that the prediction error signal before modulation in the amplitude modulating means 2 may be optimally regenerated. In which case, the demodulation factor setting means may set the demodulation factor on the basis of the modulation factor of the amplitude modulating means 2 set by the modulation factor setting means.

The above-mentioned control information may include at least one among information as to quantization, a prediction parameter and information as to modulation by the amplitude modulating means 2.

According to this invention, the amplitude modulating means 2 conducts amplitude modulation on an amplitude of each pixel of a prediction error signal generated by the prediction error signal generating means 1 at a predetermined modulation factor, and the amplitude demodulating means 7 demodulates an amplitude of each pixel of the prediction error signal from the inverse transforming means 6 at a predetermined demodulation factor to regenerate the prediction error signal. It is therefore possible to conduct a coding process which can decrease errors in a portion visually prominent over an entire block when a moving image is regenerated so that a visually fine image may be transmitted. This feature contributes to improvement in performance of the moving image coding apparatus.

The modulation factor setting means may adaptively set a magnification as the modulation factor of the amplitude modulating means 2 depending on a pixel at which an error generated as a result of coding in a block is desired to be decreased or a pixel at which an error generated as a result of coding in a block can be permitted even if the error is large. It is therefore possible to adaptively judge a portion in which an error is visually prominent while keeping a compression efficiency so as to suppress a coding error in that portion.

According to this invention, the modulation factor of the prediction error signal set by the modulation factor setting means may be determined in an image within a block on the basis of the scale reflecting human visual sensitivity. It is therefore possible to adaptively judge a pixel that is easy to be seen as an error by man so as to conduct a compression coding which can make an error inconspicuous to man.

According to this invention, the demodulation factor setting means may set the demodulation factor in the amplitude demodulating means 7 such that the modulated prediction error signal may be optimally regenerated. It is therefore possible to generate an accurate predicted image, whereby an accuracy of the prediction coding may be improved.

Figure 2:
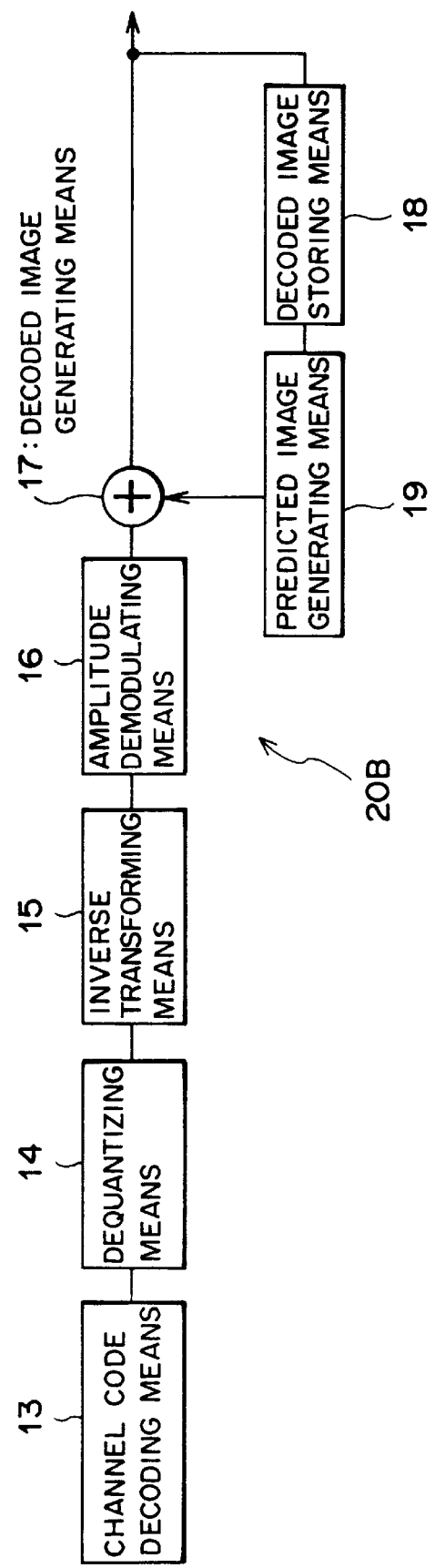

FIG. 2 is a block diagram showing another aspect of this invention. A moving image decoding apparatus 20B shown in FIG. 2 has a channel code decoding means 13, a dequantizing means 14, an inverse transforming means 15, an amplitude demodulating means 16, a decoded image generating means 17, a decoded image storing means 18 and a predicted image generating means 19.

The channel code decoding means 13 decodes a quantized transform coefficient and control information constituting moving image coded information from a moving image coding apparatus to regenerate them.

The dequantizing means 14 dequantizes the quantized transform coefficient regenerated by the channel code decoding means 13 to regenerate a transform coefficient. The inverse transforming means 15 regenerates a prediction error signal having been undergone amplitude modulation on the basis the regenerated transform coefficient. The amplitude demodulating means 16 demodulates an amplitude of each pixel of the modulated prediction error signal from the inverse transforming means 15 at a predetermined demodulation factor to regenerate a prediction error signal.

The decoded image generating means 17 adds the prediction error signal regenerated by the amplitude demodulating means 16 to a predicted image generated from a past inputted image to generate a decoded image.

The decoded image storing means 18 stores the decoded image from the decoded image generating means 17 as a decoded image decoded in the past. The predicted image generating means 19 generates a predicted image from the control information regenerated by the channel code decoding means 13 and the decoded image stored in the decoded image storing means 18.

The moving image decoding apparatus 20B may have a demodulation factor setting means for setting a demodulation factor in the amplitude demodulating means 16 such that the prediction error signal before modulation may be optimally regenerated.

The demodulation factor setting means may set a magnification relatively decreasing a value of the modulated prediction error signal to a pixel at which an error generated as a result of coding in a block is desired to be decreased as the demodulation factor, while setting a magnification relatively increasing a value of the modulated prediction error signal to a pixel at which an error generated as a result of coding in a block can be permitted even if the error is large as the demodulation factor.

In which case, the demodulation factor of the prediction error signal set by the demodulation factor setting means may be determined in an image within a block on the basis of a scale reflecting the human visual sensitivity. Further, the demodulation factor setting means may set a magnification relatively decreasing a value of the prediction error signal to a pixel judged that an error at which is easy to be seen on that scale as the demodulation factor, while setting a magnification relatively increasing a value of the prediction error signal of a pixel judged that an error at which is difficult to be seen on that scale.

The demodulation factor setting means may determine the scale on the basis of the predicted image from the predicted image generating means 19.

The above-mentioned control information from the moving image coding apparatus may include at least one among information as to quantization, a prediction parameter and information as to modulation.

In the above-mentioned moving image decoding apparatus 20B, the channel code decoding means 13 decodes a quantized transform coefficient and control information constituting moving image coded information having been undergone amplitude modulation from a moving image coding apparatus to regenerate them.

The dequantizing means 14 dequantizes the regenerated quantized transform coefficient to regenerate a transform coefficient. The inverse transforming means 15 regenerates a modulated prediction error signal on the basis of the regenerated transform coefficient. The amplitude demodulating means 16 demodulates an amplitude of each pixel of the prediction error signal having been undergone amplitude modulation at a predetermined demodulation factor to regenerate a prediction error signal.

According to this invention, the amplitude demodulating means 16 may demodulates an amplitude of each pixel of the modulated prediction error signal from the inverse transforming means 15 at a predetermined demodulation factor so that a fine image in which visually prominent errors are decreased over an entire block may be regenerated. This feature contributes to improvement in performance of the apparatus.

According to this invention, the demodulation factor setting means may generate the demodulation factor of the amplitude demodulating means 16 such that the prediction error signal before modulation may be optimally regenerated. It is therefore possible to generate a decoded image in a high accuracy with the regenerated prediction error signal so that an accuracy of the decoding in an image processed in prediction coding may be improved.

According to this invention, the demodulation factor setting means may adaptively set a magnification as the demodulation factor of the amplitude demodulating means 16 depending on a pixel at which an error generated as a result of coding is desired to be decreased or a pixel at which an error generated as a result of coding of a block can be permitted even if the error is large. It is therefore possible to adaptively judge a portion in which an error is visually prominent so as to suppress a coding error in that portion when an image is decoded and regenerated.

According to this invention, the demodulation factor of the prediction error signal set by the demodulation factor setting means may be determined in an image within a block on the basis of a scale reflecting the human visual sensitivity. It is therefore possible to adaptively judge a pixel which is apt to be seen as an error by men so as to regenerate an image in which a pixel is difficult to be judged as an error by men.

A moving image coding apparatus according to this invention has a prediction error signal generating means for dividing an inputted image into blocks each consisting of plural pixels, and computing a difference between the inputted image and a predicted image generated from a past inputted image to generate a prediction error signal, an amplitude modulating means for conducting amplitude modulation on an amplitude of each pixel of the prediction error signal generated by the prediction error signal generating means at a predetermined modulation factor, a first switching means for selectively switching to either the prediction error signal from the prediction error signal generating means or a prediction error signal having been undergone amplitude modulation by the amplitude modulating means and outputting it, a transforming means for transforming the prediction error signal from the first switching means in order to remove correlation among the pixels to generate a transform coefficient, a quantizing means for quantizing the transform coefficient from the transforming means, a dequantizing means for dequantizing the quantized transform coefficient form the quantizing means to regenerate the transform coefficient, an inverse transforming means for regenerating the prediction error signal having been undergone amplitude modulation on the basis of the regenerated transform coefficient, an amplitude demodulating means for demodulating an amplitude of each pixel of the prediction error signal from the inverse transforming means at a predetermined demodulation factor to regenerate the prediction error signal, a second switching means for selectively switching to either the prediction error signal regenerated by the inverse transforming means or the prediction error signal having been undergone amplitude demodulation by the amplitude demodulating means and outputting it to a decoded image generating means, the decoded image generating means for adding the prediction error signal from the second switching means to the predicted image to generate a decoded image, a decoded image storing means for storing therein the decoded image from the decoded image generating means as a decoded image decoded in the past, a prediction parameter calculating means for calculating a prediction parameter used to generate the predicted image from the decoded image stored in the decoded image storing means such that an error between the decoded image and an inputted image inputted following the decoded image is decreased, a predicted image generating means for generating the predicted image from the prediction parameter calculated by the prediction parameter calculating means and the decoded image stored in the decoded image storing means, a channel coding means for assigning codes to control information along with the quantized transform coefficient from the quantizing means and outputting them as moving image coded information, a third switching means for selectively switching to either the predicted image generated by the predicted image generating means or a signal representing that there is no predicted image and outputting it to the prediction error signal generating means and the decoded image generating means, and a first control means for controlling switching each of the above switching means according to the block.

In this case, the control means may control switching of each of the switching means on the basis of the prediction parameter calculated by the prediction parameter calculating means.

According to this invention, the amplitude modulating means conducts amplitude modulation on an amplitude of each pixel of the prediction error signal generated by the prediction error signal generating means at a predetermined modulation factor, and the amplitude demodulating means demodulates an amplitude of each pixel of the prediction error signal from the inverse transforming means at a predetermined demodulation factor to regenerate the prediction error signal, whereby a coding process which can decrease errors in a visually prominent portion is feasible over en entire block when a moving image is regenerated so as to transmit a visually fine image. This feature contributes to improvement in performance of the moving image coding apparatus.

Owing to the first switching means, the second switching means, the third switching means and the first control means, it is possible to adaptively select a mode of intraframe coding or interframe coding according to a block so that an efficient compression coding according to a block becomes feasible.

A moving image decoding apparatus according to this invention has a channel code decoding means for decoding a quantized transform coefficient and control information constituting moving image coded information from a moving image coding apparatus to regenerate them, a dequantizing means for dequantizing the quantized transform coefficient regenerated by the channel code decoding means to regenerate a transform coefficient, an inverse transforming means for regenerating a prediction error signal having been undergone amplitude modulation on the basis of the regenerated transform coefficient, an amplitude demodulating means for demodulating an amplitude of each pixel of the modulated prediction error signal from the inverse transforming means at a predetermined demodulation factor to regenerate a prediction error signal, a fourth switching means for selectively switching to either the prediction error signal regenerated by the inverse transforming means or the prediction error signal having been undergone amplitude demodulation by the amplitude demodulating means and outputting it to a decoded image generating means, the decoded image generating means for adding the prediction error signal from the fourth switching means to a predicted image generated from a past inputted image to generate a decoded image, a decoded image storing means for storing the decoded image from the decoded image generating means as a decoded image decoded in the past, a predicted image generating means for generating a predicted image from the control information regenerated by the channel code decoding means and the decoded image stored in the decoded image storing means, a fifth switching means for selectively switching to either the predicted image generated by the predicted image generating means or a signal representing that there is no predicted image and outputting it to the decoded image generating means, and a second control means for controlling switching of each of the switching means according to a block.

In this case, the control information regenerated by the channel code decoding means is configured with a prediction parameter. On the other hand, the second control means controls switching of the above-mentioned fourth switching means and fifth switching means on the basis of the prediction parameter.

According to this invention, the amplitude demodulating means may demodulate an amplitude of each pixel of the modulated prediction error signal from the inverse transforming means at a predetermined demodulation factor. If a moving image modulated in coding is received, it is possible to regenerate a fine image in which visually prominent errors are decreased over an entire block. This feature contributes to improvement in performance of the apparatus.

Owing to the fourth switching means, the fifth switching means and second control means, it is possible to adaptively select a mode of intraframe coding or interframe coding according to a block on the basis of the prediction parameter as the control information. This feature enables efficient compression coding according to a block.

Incidentally, a moving image coding-decoding apparatus of this invention has a moving image coding unit having a function as the above-mentioned moving image coding apparatus 20A shown in FIG. 1 and a moving image decoding unit having a function as the above-mentioned moving image decoding apparatus 20B shown in FIG. 2.

Namely, the moving image coding-decoding apparatus of this invention has the moving image coding unit including a prediction error signal generating unit for dividing an inputted image into blocks each consisting of plural pixels, and computing a difference between the inputted image and a predicted image generated from a past inputted image to generate a prediction error signal, an amplitude modulating means for modulating an amplitude of each pixel of the prediction error signal generated by the prediction error signal generating means at a predetermined modulation function, a transforming means for transforming the prediction error signal having been undergone amplitude modulation by the amplitude modulating means in order to remove correlation among the pixels to generate a transform coefficient, a quantizing means for quantizing the transform coefficient from the transforming means, a dequantizing means for dequantizing the quantized transform coefficient from the quantizing means to regenerate the transform coefficient, an inverse transforming means for regenerating the prediction error signal having been undergone amplitude modulation on the basis of the regenerated transform coefficient, an amplitude demodulating means for demodulating amplitude of each pixel of the prediction error signal from the inverse transforming means at a predetermined demodulation factor to regenerate the prediction error signal, a decoded image regenerating means for adding the prediction error signal regenerated by the amplitude demodulating means to a predicted image to generate a decoded image is decreased, a decoded image storing means for storing therein the decoded image from the decoded image generating means as a decoded image decoded in the past, a prediction parameter calculating means for calculating a prediction parameter used to generate the prediction image from the decoded image stored in the decoded image storing means such that an error between the decoded image and an inputted image inputted following the decoded image, a predicted image generating means for generating a predicted image from the prediction parameter calculated by the prediction parameter calculating means and the decoded image stored in the decoded image storing means, and a channel coding means for assigning codes to the control information along with the quantized transform coefficient from the quantizing means and outputting them as moving image coded information. The moving image coding-decoding apparatus also has a moving image decoding unit including a channel code decoding unit for decoding a quantized transform coefficient and control information constituting moving image coded information from a moving image coding apparatus to regenerate them, a dequantizing means for dequantizing the quantized transform coefficient regenerated by the channel code decoding unit to regenerate a transform coefficient, an inverse transforming means for regenerating a prediction error signal having been undergone amplitude modulation on the basis of the regenerated transform coefficient, an amplitude demodulating means for demodulating an amplitude of each pixel of the modulated prediction error signal from the inverse transforming means at a predetermined demodulation factor to regenerate a prediction error signal, a decoded image generating means for adding the prediction error signal regenerated by the amplitude demodulating means to a predicted image generated from a past inputted image to generate a decoded image, a decoded image storing means for storing the decoded image from the decoded image generating means as a decoded image decoded in the past, and a predicted image generating means for generating a predicted image from the control information regenerated by the channel code decoding means and the decoded image stored in the decoded image storing means.

According to this invention, the amplitude modulating means conducts amplitude modulation on an amplitude of each pixel of a prediction error signal generated by the prediction error signal generating means at a predetermined modulation factor, and the amplitude demodulating means demodulates an amplitude of each pixel of a prediction error signal from the inverse transforming means at a predetermined demodulation factor to regenerate the prediction error signal, whereby a coding process which can decrease visually prominent errors over en entire block when a moving image is regenerated so that a visually fine image can be transmitted. This feature contributes to improvement in performance of the moving image coding apparatus.

(b) Description of a Moving Image Coding Apparatus

Figure 3:
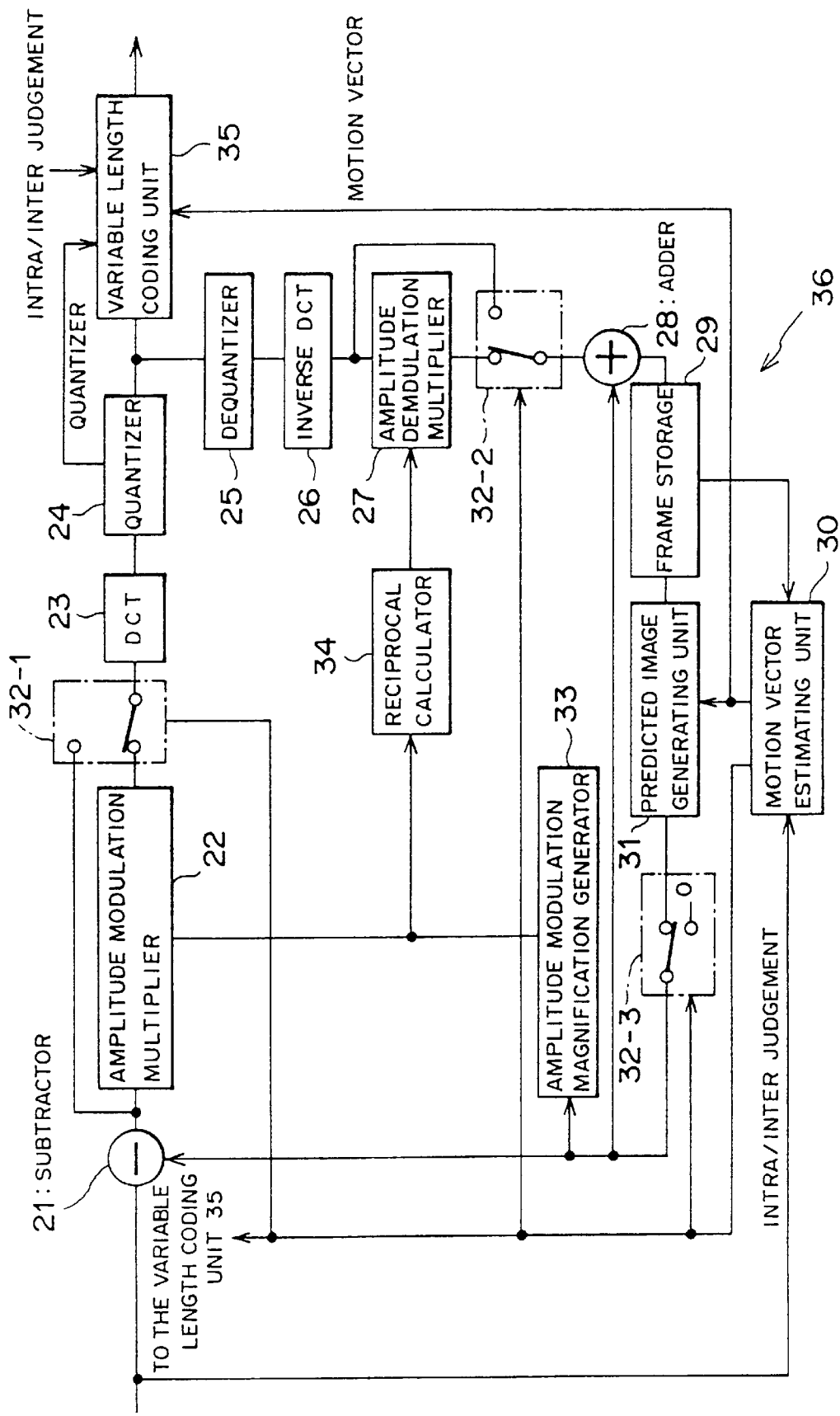
FIG. 3 is a block diagram showing a moving image coding apparatus according to an embodiment of this invention.

FIG. 3 is a block diagram showing a moving image encoding apparatus according to an embodiment of this invention. A moving image encoding apparatus 36 shown in FIG. 3 transmits digital moving image data in a smaller data quantity than that of original image data using a data compressing technique.

Here, reference numeral 21 denotes a subtractor. The subtractor 21 has a function as a prediction error signal generating means for computing a difference between an inputted image and a predicted image generated from a past inputted image (an inputted image before one frame, for example) to generate a prediction error signal.

Reference numeral 22 denotes an amplitude modulation multiplier. The amplitude modulation multiplier 22 has a function as an amplitude modulating means for multiplying an amplitude of each pixel of the prediction error signal calculated by the subtractor 21 by a magnification as a predetermined modulation factor set by an amplitude modulation magnification generating unit 33, which will be described later, thereby conducting amplitude modulation.

Reference numeral 32-1 denotes a selector as a first switching means. The selector 32-1 selectively switches to either a prediction error signal from the subtractor 21 or a prediction error signal having been undergone amplitude modulation from the amplitude modulation mutliplier 22, and outputs it.

Reference numeral 23 denotes a discrete cosine transforming unit (DCT, Discrete Cosine Transform). The discrete cosine transforming unit 23 has a function as a transforming unit for conducting orthogonal transform on the prediction error signal from the selector 32-1 in order to remove correlation among pixels to generate a transform coefficient.

Further, reference numeral 24 denotes a quantizer as a quantizing means for quantizing a DCT coefficient as the transform coefficient from the discrete cosine transforming unit 23. Reference numeral 25 denotes a dequantizer as a dequantizing unit for dequantizing the quantized transform coefficient from the quantizer 24 to regenerate the transform coefficient. Reference numeral 26 denotes an inverse discrete cosine transforming unit (an inverse DCT) as an inverse transforming unit for regenerate the prediction error signal having been undergone amplitude modulation on the basis of the regenerated transform coefficient.

In other words, the inverse discrete cosine transforming unit 26 conducts transform reverse to that by the discrete cosine transforming unit 23 on the regenerated transform coefficient by the dequantizer 25 to regenerate the prediction error signal.

Still further, reference numeral 27 denotes an amplitude demodulation multiplier. The amplitude demodulation multiplier 27 has a function as an amplitude demodulating means for demodulating an amplitude of each pixel of the prediction error signal from the inverse discrete cosine transforming unit 26 at a predetermined demodulation factor calculated by the amplitude modulation magnification generating unit 33 and a reciprocal calculator 34, which will be described later, to regenerate the prediction error signal.

Reference numeral 32-2 denotes a selector as a second switching means. The selector 32-2 selectively switches to either the prediction error signal regenerated by the inverse discrete cosine transforming unit 26 or the prediction error signal having been undergone amplitude demodulation in the amplitude demodulation multiplier 27, and outputs it to an adder 28.

The adder 28 has a function as a decoded image generating unit for adding the prediction error signal from the selector 32-2 to a predicted image generated by a predicted image generating unit 31, which will be described later, to generate a decoded image.

Reference numeral 29 denotes a frame storage as a decoded image storing means for storing the decoded image from the adder 28 as a decoded image decoded in the past. The frame storage 29 stores the decoded image for one frame or plural frames, for example.

Reference numeral 30 denotes a motion vector estimating unit as a prediction parameter calculating means. The motion vector estimating unit 30 calculates a motion vector as a prediction parameter used to generate a predicted image from the decoded image stored in the frame storage 29 such that an error between the decoded image and an inputted image inputted following the decoded image.

In other words, the prediction parameter calculating means 30 calculates a motion vector of an original image in relation to an image one frame before or plural frames before. The predicted image generating unit 31 generates a predicted image with the motion vector as a prediction parameter.

Further, the predicted image generating unit 31 has a function as a predicted image generating means for generating a predicted image from the prediction parameter calculated by the prediction parameter calculating means and the decoded image stored in the frame storage 29.

Reference numeral 32-3 denotes a selector as a third switching means. The selector 32-3 selectively switches to either the predicted image generated by the predicted image generating unit 31 or a signal representing that there is no predicted image, and outputs it to the above-mentioned prediction error signal generating unit 21, the adder 28 and the amplitude modulation magnification generator 33.

The motion vector estimating unit 30 judges whether amplitude modulation/demodulation should be conducted on a prediction error signal in an object block according to a result of the calculation of a prediction parameter for each block so as to control switching of the selectors 32-1 through 32-3 on the basis of a result of the judgement [information as to a judgement of intraframe coding (Intra)/interframe coding (Inter)].

In concrete, if it is found from a result of the above calculation of the prediction parameter that the block is in an Intra (intraframe coding) mode or correlation between the predicted image and the original image is in a low degree so that an appropriate amplitude modulation function cannot be determined from the predicted image, etc., the motion vector estimating unit 30 judges that amplitude modulation/demodulation on the prediction error signal in the object block is not conducted (Intra).

In this case, the motion vector estimating unit 30 so controls the selector 32-1 that the prediction error signal from the subtractor 21 is inputted to the discrete cosine transforming unit 23, so controls the selector 32-2 that the prediction error signal from the inverse discrete cosine transforming unit 26 is inputted to the adder 28, and so controls the selector 32-3 that a signal representing that there is no predicted image is inputted to the subtractor 21 and the adder 28.

If it is judged in the motion vector estimating unit 30 that the block is in the Inter (interframe coding) mode so that amplitude modulation/demodulation should be conducted, the motion vector estimating unit 30 so controls the selector 32-1 that the prediction error signal from the amplitude modulation multiplier 22 is inputted to the discrete cosine transforming unit 23, so controls the selector 32-2 that the prediction error signal from the amplitude demodulation multiplier 27 is inputted to the adder 28, and so controls the selector 32-3 that a predicted image generated by the predicted image generating unit 31 is inputted to the subtractor 21 and the adder 28.

The above-mentioned motion vector estimating unit 30 has, therefore, a function as a first control means for adaptively controlling switching between the interframe coding and the intraframe coding by controlling switching each of the above-mentioned selectors 32-1 through 32-3.

The result of the above-mentioned judgement as to whether amplitude modulation/demodulation should be conducted or not can be transmitted to the moving image decoding apparatus as control information, whereby ON/OFF of amplitude modulation on the prediction error signal can be done on the basis of the result of the above-mentioned judgement on the decoding apparatus side.

Still further, reference numeral 35 denotes a variable length coding unit as a channel coding means. The variable length coding unit 35 assigns codes such as Huffmann codes or the like to a quantized transform coefficient from the quantizer 24 and the control information necessary upon decoding on the moving image decoding apparatus side, and outputs them as compressed moving image coded information.

The above control information consists of, for example, information as to quantization by the quantizer 24, a prediction parameter calculated by the motion vector estimating unit 30 (including information as to whether the prediction error signal should be modulated/demodulated or not) or information as to a modulating manner of the amplitude modulation multiplier 22 generated by the amplitude modulation magnification generator 33 described later, or an arbitrary combination of these information.

The amplitude modulation magnification generator 33 sets a modulation factor in the amplitude modulation multiplier 22 on the basis of information as to a predicted image (including a signal representing that there is no predicted image) inputted from the selector 32-3.

Namely, the amplitude modulation magnification generator 33 has a function as a modulation factor setting means. The amplitude modulation magnification factor generator 33 sets a relatively large magnification as a modulation factor of the amplitude modulation multiplier 22 to a pixel at which an error generated as a result of coding in the block is desired to be decreased, while setting a relatively small magnification as a modulation factor of the amplitude modulation multiplier 22 to a pixel at which an error generated as a result of coding in the block can be permitted if the error is large.

Incidentally, it is possible, as a mode of setting a modulation factor of a prediction error signal in the amplitude modulation magnification generator 33, to set a modulation factor in an image within a block by setting a function used to transform an amplitude of the prediction error signal using a scale reflecting the human visual sensitivity (a scale representing how much prominent an error is to men if the error is applied to the neighbourhood of the pixel of an image).

In other words, the amplitude modulation magnification generator 33 sets a relatively larger magnification to a value of a prediction error signal of a pixel judged on the above scale that an error is easier to be seen as a modulation factor for the prediction error signal in the amplitude modulation multiplier 22. On the other hand, the amplitude modulation magnification generator 33 sets a relatively smaller magnification to a value of a prediction error signal of a pixel judged on the above scale that an error is more difficult to be seen.

The above scale as to whether an error is prominent or not can be determined using, for example, local disperse of an image, functions such as a Potential Visibility Function (potential error visibility) of an image and the like, or relation between a visibility of an error and a luminance.

Further, the amplitude modulation magnification generator 33 can determine the above scale reflecting the human visual sensitivity on the basis of a predicted image from the predicted image generating unit 31.

A predicted image used in conducting moving image coding has a high correlation with a coded image. If the predicted image is used as a scale of the error visibility in the similar algorithm in both the coding apparatus and decoding apparatus, it is possible to adaptively determine a function used to transform an amplitude of a prediction error signal in the amplitude modulation magnification generator 33.

In which case, it is possible to determine a function used to transform an amplitude of each pixel in a common algorithm using common information on both transmitting and receiving sides so that it becomes unnecessary to transmit information as to determination of the function.

The above-mentioned function used to transform an amplitude of a prediction error signal determined in the amplitude modulation magnification generator 33 may be, in concrete, determined on the basis of an activity (complexity of an image) and a luminance of a background image as described below.

First, a function used to transform an amplitude of a prediction error signal on the basis of an activity may be determined as below.

Figure 4:
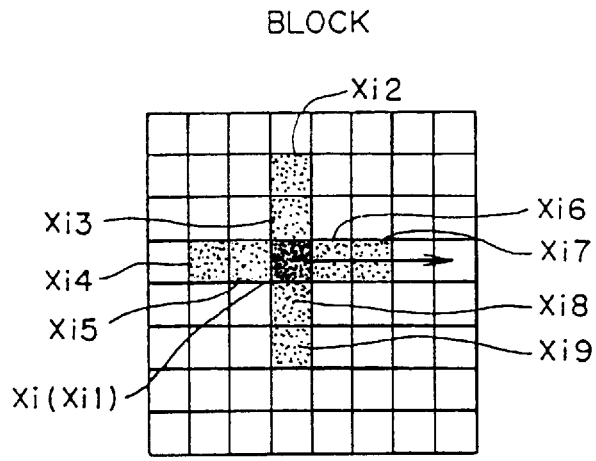
Figure 4:
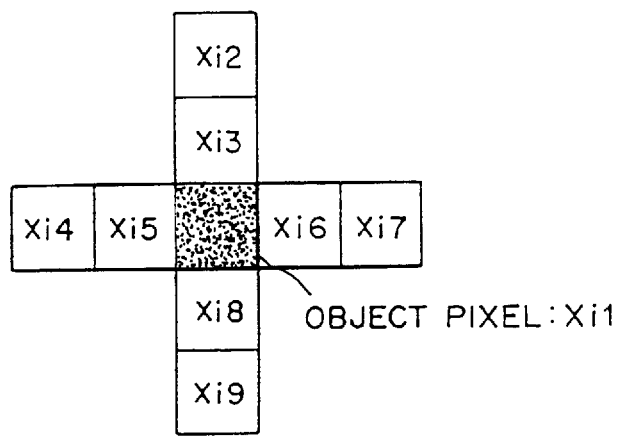
Figure 4:
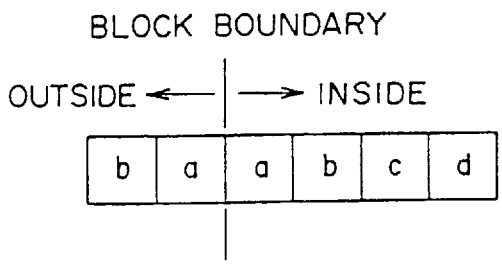

If a block to be an object of coding consists of, for example, 8×8 pixels $X_1$ through $X_{64}$ as shown in FIG. 4($a$), a local activity at a certain pixel $X_i$ is determined as follows. Incidentally, there is a case where inscriptions of variables differ from formulae.

As shown in FIG. 4($b$), assuming here that eight pixels in the vicinity of the pixel $X_i$ are determined as respective pairs of pixels on the left and right sides and in the up and down sides of the object pixel, $X_{i1}$ through $X_{i9}$ are given to the object and neighbouring pixels, and a value of each of the pixels is $x_{ij}$, disperse $\sigma_i^2$ of the pixel $X_i$ is defined by a formula (1) shown below.

If the object pixel is adjacent to a block boundary, pixel values of neighbouring pixels outside the block and pixels inside the block are set so as to be symmetric with respect to the block boundary as shown in FIG. 4($c$).

For instance, if the object pixel $X_{i1}$ is located at the left end, pixel values $x_{i4}$ and $x_{i5}$ of $X_{i4}$ and $X_{i5}$ outside the block are so set as to be equal to a pixel value $X_{i1}$ ['a' in FIG. 4($c$)] of the object pixel and a pixel value $X_{i6}$ ['b' in FIG. 4($c$)] of a pixel $X_{i6}$, respectively.

$$\sigma_i^2 = (1/9) \sum_{j=1}^{9} X_{ij}^2 - \left\{ (1/9) \sum_{j=1}^{9} X_{ij} \right\}^2 \quad (1)$$

Therefore, an activity $A_i$ of a pixel $X_i$ is defined as shown by a formula (2) using a constant C such that a value of the activity Ai is larger than 0.

$$A_i = \max (C, \sigma_i^2) \quad (2)$$

An average activity A within a block is defined as shown by a formula (3).

$$\bar{A} = (1/64) \sum_{i=1}^{64} A_i \quad (3)$$

A magnification $K_i$ of amplitude modulation for a pixel $X_i$ within a block relying on complexity of the image is thereby defined as given by a formula (4).

$$K_i = A_i / \bar{A} \quad (4)$$

Following that, a magnification of amplitude modulation on the basis of a visibility of an applied error dependent of a luminance of a background image may be determined as below.

Figure 5:
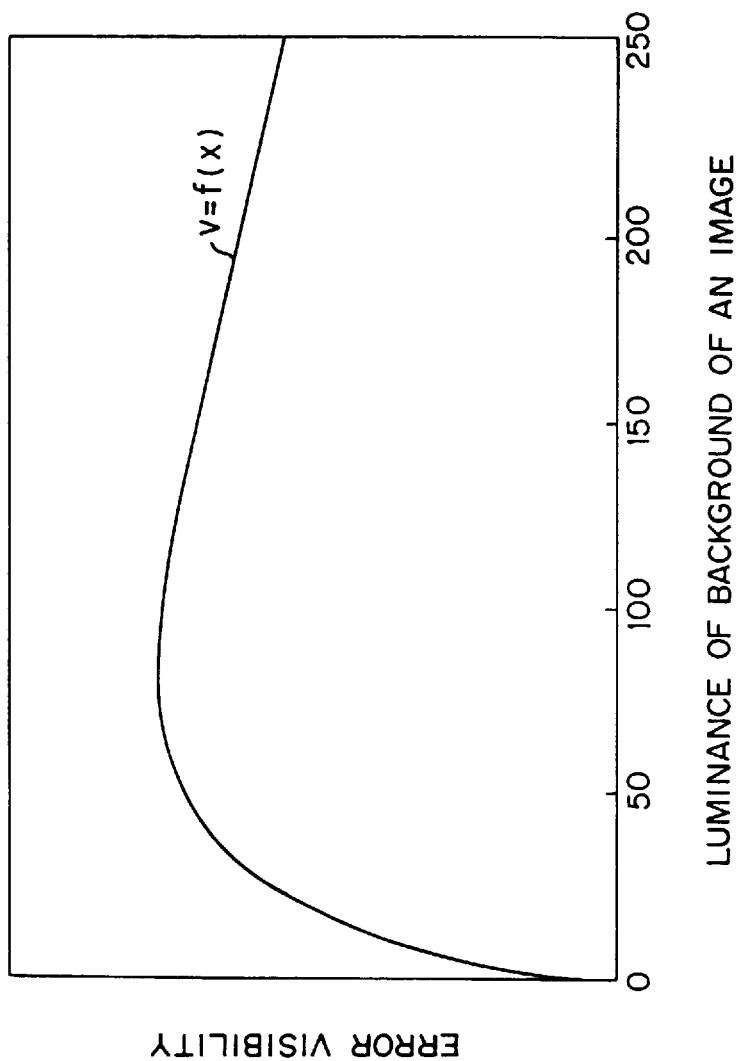
FIG. 5 is a diagram for illustrating the manner of calculating the modulation/demodulation factor for the prediction error signal according to the embodiment.

Here, a degree of visibility of an error to a luminance of a background has a characteristic v=f (x) (v:error visibility, x:luminance of background) as shown in FIG. 5, for example.

Figure 6:
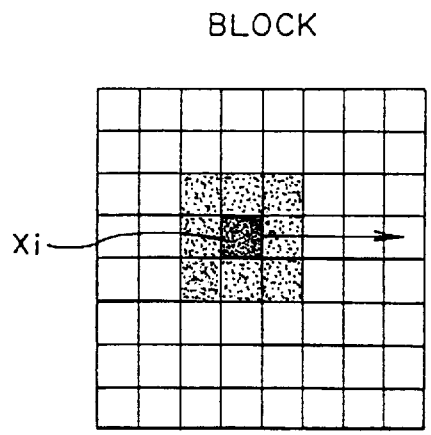
FIGS. 6(a) through 6(c) are diagrams for illustrating the manner of calculating the modulation/demodulation factor according to the embodiment.
Figure 6:
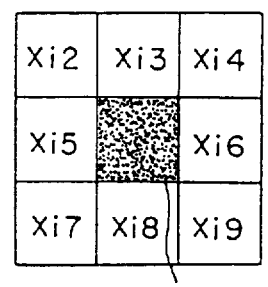
Figure 6:
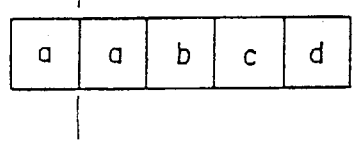
Figure 9:
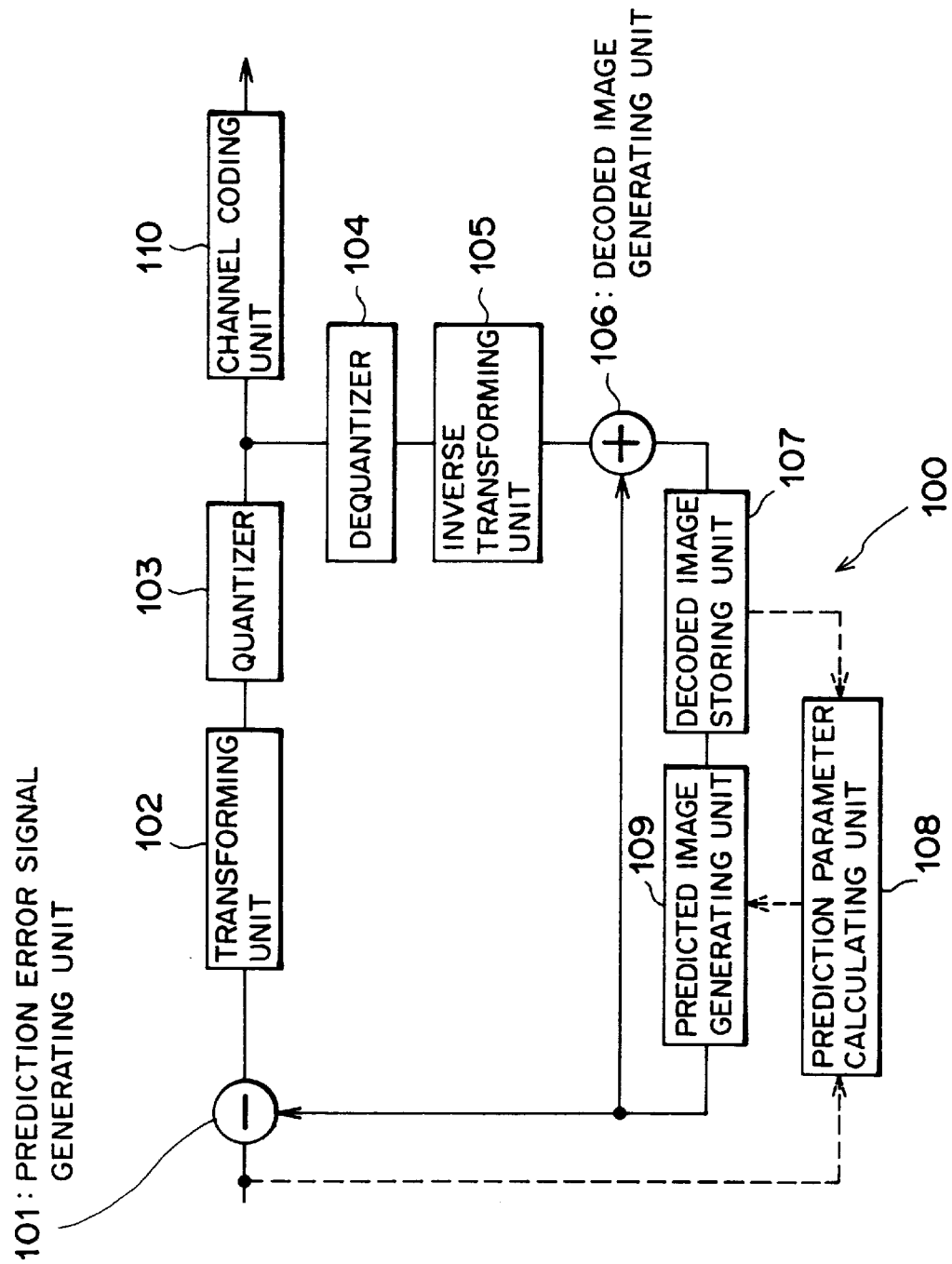
FIG. 9 is a block diagram showing a moving image coding apparatus based on a standard system.
Figure 10:
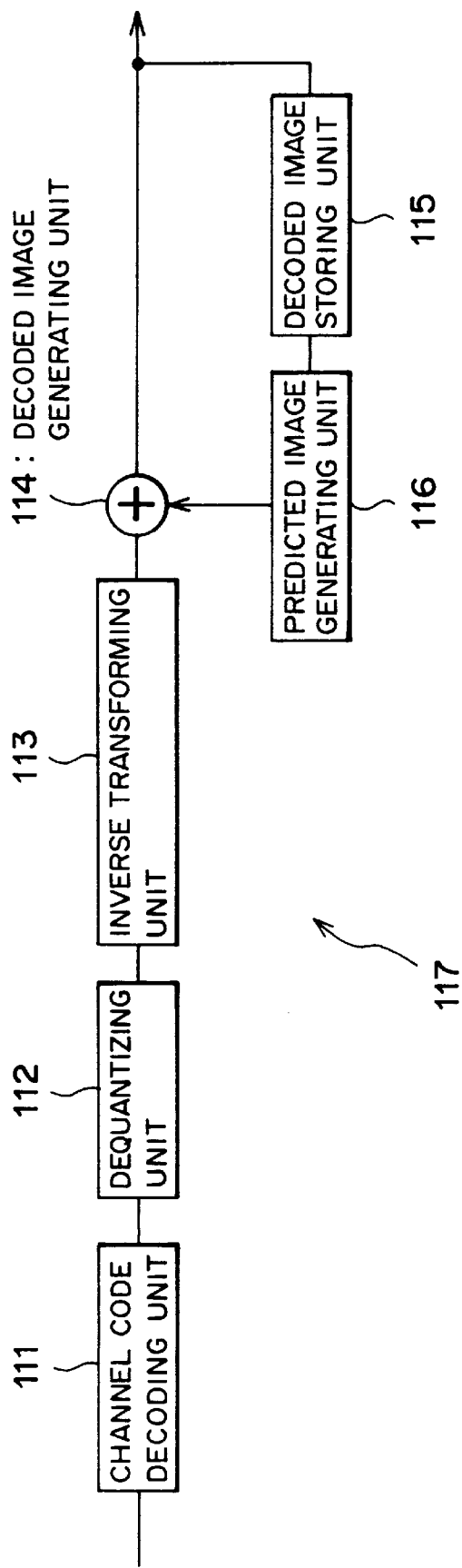
FIG. 10 is a block diagram showing a moving image decoding apparatus based on the standard system.

Assuming here, as shown in FIG. 6($a$), that eight pixels in the vicinity of an object pixel $X_i$ are defined as eight pixels surrounding the object pixel, the object pixel and the pixels in the vicinity of the object pixel are defined as $X_{i1}$ through $X_{i9}$, and a value of each of these pixel is $X_{ij}$, an error visibility $V_i$ of a pixel i is given by a formula (5) below.

Incidentally, if a pixel in the vicinity of the object pixel $X_i$ is outside the block, a pixel value of the pixel outside the block may be set to be equal to a pixel value of an adjacent pixel inside the block ('a' in this case).

$$V_i = (1/9) \sum_{j=1}^{9} f(X_{ij}) \quad (5)$$

A magnification Li of amplitude modulation for a pixel $X_i$ within a block dependent of a luminance of a background of an image is thereby defined as given by the following formula (6) by using a suitable constant D.

$$L_i = D/V_i \quad (6)$$

Accordingly, a magnification $M_i$ for amplitude modulation on a prediction error of a pixel i within an object block dependent of a complexity and luminance of an image may be determined as given by a formula (7) using a magnification $K_i$ of amplitude modulation of a pixel i within a block dependent of a complexity of an image and a magnification $L_i$ of amplitude modulation of a pixel i within a block dependent of a luminance of an image.

$$M_i = K_i \cdot L_i \quad (7)$$

Namely, a magnification $M_i$ as given by the above formula (7) is used as a function to determine a modulation factor for a pixel i within an object block in the amplitude modulation magnification generator 33.

Meanwhile, the reciprocal calculator 34 has a function as a demodulation factor setting means for setting a modulation factor in the amplitude demodulation multiplier 27 so that the prediction error signal before modulation in the amplitude modulation multiplier 22 can be optimally regenerated. The reciprocal calculator 34 sets a demodulation factor on the basis of a modulation factor of the amplitude modulation multiplier 22 set by the amplitude modulation magnification generator 33.

In concrete, the reciprocal calculator 34 calculates an inverse function of a function [refer to the above formula (7)] as a modulation factor of the amplitude modulation multiplier 22 set by the amplitude modulation magnification generator 33, and sets the calculated inverse function or a function having a characteristic similar to the inverse function as a demodulation factor in the amplitude demodulation multiplier 27.

With the above structure, the moving image coding apparatus according to the embodiment of this invention operates as follows.

Namely, the motion vector estimating unit 30 judges an intraframe coding (Intra)/interframe coding (Inter) as an operation mode according to a result of calculation of a prediction parameter for each block, and controls switching of the selectors 32-1 through 32-3 on the basis of a result of the judgement.

Particularly, in a block judged as an interframe coding, the subtractor 21 is inputted thereto a block of an inputted image along with a predicted image generated by the predicted image generating unit 31 via the selector 32-3 to generate a prediction error signal by computing a difference between the inputted image and the predicted image.

The amplitude modulation multiplier 22 conducts amplitude modulation on an amplitude of each pixel of the prediction error signal from the subtractor 21 at a predetermined modulation factor set by the amplitude modulation magnification generator 33, and outputs the modulated prediction error signal to the discrete cosine transforming unit 23 via the selector 32-1.

The discrete cosine transforming unit 23 transforms the prediction error signal having been undergone amplitude modulation in order to remove correlation among pixels so as to generate a transform coefficient, then the quantizer 24 quantizes the generated transform coefficient.

Whereby, the variable length coding unit 35 assigns codes to the transform coefficient quantized by the quantizer 24 and the control information used for decoding on the moving image decoding apparatus side, and outputs them as moving image coding information.

When a predicted image is generated, the adder 28 adds the prediction error signal regenerated through the dequantizer 25, the inverse discrete cosine transforming unit 26, the amplitude demodulation multiplier 27 and the selector 32-2 to the predicted image inputted via the predicted image generating unit 31 and the selector 32-3 to decode an inputted image.

The predicted image generating unit 31 thereby generates a predicted image on the basis of the decoded image from the frame storage 29 and the prediction parameter calculated by the motion vector estimating unit 30.

The above-mentioned amplitude modulation multiplier 22 modulates the prediction error signal prior to quantization, while the amplitude demodulation multiplier 27 conducts amplitude demodulation on a result of inverse discrete cosine transform, whereby it is possible to diminish a visually prominent error as concretely described below.

A prediction error signal generated in a block including a flat portion and a complex portion by the subtractor 21 as shown in FIG. 7(a) is modulated at a modulation factor different from pixel to pixel within the block as shown in FIG. 7(b).

Meanwhile, an error in a flat portion [refer to a region in which there is no wave fluctuation in FIG. 7(a)] is apt to be prominent than an error in a complex portion due to the human visual sensitivity. It is therefore necessary to decrease an error in the flat portion generated as a result of coding. An error in a complex portion [refer to a region in which there is a wave fluctuation in FIG. 7(a)] is apt to be less prominent than an error in the flat portion so that it is unnecessary to decrease so much an error as in the flat portion.

In consequence, the amplitude modulation magnification generator 33 sets a relatively large magnification (a value larger than 1) to pixels in the flat portion as a modulation factor used by the amplitude modulation multiplier 22, while setting a relatively small magnification (a value smaller than 1) to pixels in the complex portion. As a result, a prediction error signal as a result of modulation by the amplitude modulation multiplier 22 has a smaller level fluctuation in the complex portion as shown in FIG. 7(c).

When the prediction error signal having been undergone orthogonal transform and quantization through the discrete cosine transforming unit 23, the quantizer 24, the dequantizer 25 and the inverse discrete cosine transforming unit 26 is decoded/regenerated, the regenerated prediction error signal is added a coding noise having a substantially uniform magnitude in a broad aspect as shown in FIG. 7(d).

In other words, the regenerated prediction error signal shown in FIG. 7(d) is added a uniform coding noise in a broad aspect as shown in FIG. 7(e) over its flat portion to complex portion.

The amplitude demodulation multiplier 27 performs, as shown in FIG. 7(f), a demodulating process having an inverse characteristic of a modulating process performed by the above-mentioned amplitude modulation multiplier 22 on the regenerated prediction error signal as shown in FIG. 7(d), thereby obtaining a prediction error signal as shown in FIG. 7(g).

In other words, as a demodulation factor used by the amplitude demodulation multiplier 27 set by the reciprocal calculating unit 34, a relatively small magnification (a value smaller than 1) is set to pixels in the flat portion, whereas a relatively large magnification (a value larger than 1) to pixels in the complex portion. In consequence, the prediction error signal as a result of demodulation in the amplitude demodulation multiplier 27 has a smaller level function in the complex portion as shown in FIG. 7(g).

The prediction error signal to which uniform coding noises in a broad aspect are added over the flat portion and the complex portion as shown in FIG. 7(e) is demodulated as shown in FIG. 7(g), whereby it is possible to decrease a coding noise (a mosquito noise) in the flat portion which is apt to be prominent due to the human visual sensitivity as shown in FIG. 7(g).

If the motion vector estimating unit 30 judges that interframe coding should be conducted in the block, the subtractor 21 is inputted thereto a signal representing that there is no predicted image. In addition, the prediction error signal from the subtractor 21 is undergone orthogonal transform without being modulated, besides the prediction error signal from the inverse discrete cosine transforming unit 26 is outputted to the adder 28 without being demodulated.

In the moving image coding apparatus according to this embodiment of this invention, the amplitude modulation multiplier 22 conducts amplitude modulation on an amplitude of each pixel of a prediction error signal generated by the subtractor 21 at a predetermined modulation factor, the amplitude demodulation multiplier 27 demodulates an amplitude of each pixel of the predicted error signal from the inverse discrete cosine transforming unit 26 at a predetermined demodulation factor to regenerate the prediction error signal. Accordingly, it is possible to carry out such a coding process as to decrease an error in a portion visually prominent over an entire block when a moving image is regenerated. This feature contributes to improvement in performance of the moving image coding apparatus since it is possible to transmit visually fine images.

The amplitude modulation magnification generating unit 33 can adaptively set a magnification as a modulation factor of the amplitude modulation multiplier 22 depending on a pixel at which an error generated as a result of coding is desirable to be decreased or a pixel at which an error generated as a result of coding a block can be permitted even if it is large. It is therefore possible to adaptively judge a part in which an error is visually prominent so as to suppress a coding error in that part while keeping a compression efficiency.

Further, a modulation factor of a prediction error signal set by the amplitude modulation magnification generating unit 33 may be determined in an image within a block on the basis of a scale reflecting the human visual sensitivity so that it is possible to adaptively judge a pixel which is apt to be seen as an error by man so as to conduct compression coding which can put an error out of human sight.

The amplitude modulation magnification generator 33 and the reciprocal calculator 34 can so set a demodulation factor in the amplitude demodulation multiplier 27 as to optimally regenerate a modulated prediction error signal, whereby an accuracy of prediction coding may be improved.

Further, owing to the selectors 32-1 through 32-3 and the motion vector estimating unit 30, it is possible to adaptively select a mode of either intraframe coding or interframe coding according to a block. This realizes an efficient compression coding according to a block.

(c) Description of a Moving Image Decoding Apparatus

FIG. 8 is a block diagram showing a moving image decoding apparatus according to an embodiment of this invention. A moving image decoding apparatus 51 shown in FIG. 3 decompresses moving image coded information from the above-mentioned moving image coding apparatus 36 shown in FIG. 3 to regenerate an original image.

The moving image decoding apparatus 51 according to the embodiment has a dequantizer 42, an inverse discrete cosine transforming unit (an inverse DCT) 43, an amplitude demodulation multiplier 44, an adder 45, a frame storage 46, a predicted image generating unit 47, an amplitude modulation magnification generator 48 and a reciprocal calculator 49 having functions similar to those [refer to reference numerals 25 through 29, 31, 33 and 34 ] in the moving picture coding apparatus 36 described hereinbefore with reference to FIG. 3. The moving image decoding apparatus 51 also has a variable length decoder 41 and selectors 50-1, 50-2.

The variable length decoder 41 has a function as a channel code decoding means for decoding a quantized transform coefficient and control information constituting moving image coded information from the moving image coding apparatus 36 to regenerate them.

The control information from the above-mentioned moving image coding apparatus 36 consists of, for example, information as to quantization, information as to a prediction parameter (including information as to whether modulation/ demodulation should be conducted on a prediction error signal or not) or a modulating manner, other parameter information and the like.

The information as to quantization as the control information is outputted to the dequantizer 42 along with a quantized transform coefficient decoded by the variable length decoder 41. On the other hand, the prediction parameter (a motion vector) as the control information is outputted to the predicted image generating unit 47.

The information as to whether modulation/demodulation should be conducted on a prediction error signal or not in the prediction parameter constituting the control information decoded by the variable length decoder 41 is outputted as operation mode information (intraframe coding/interframe coding) to the selectors 50-1 and 50-2. Switching of the selectors 50-1 and 50-2 is controlled on the basis of a judgement on this information.

In other words, the variable length decoder 41 has a function as a second control means for controlling switching of the selectors 50-1 and 50-2 according to a block.

The dequantizing unit 42 has a function as a dequantizing means for dequantizing a quantized transform coefficient regenerated by the variable length decoder 41 on the basis of the information as to quantization inputted from the moving image coding apparatus 36 to regenerate the transform coefficient.

The inverse discrete cosine transforming unit 43 as an inverse transforming means conducts inverse transformation of the discrete cosine transforming unit 23 in the above-mentioned moving image coding apparatus 36 to regenerate a prediction error signal on the basis of the regenerated transform coefficient.

The amplitude demodulation multiplier 44 has a function as an amplitude demodulating means for demodulating an amplitude of each pixel of the modulated prediction error signal from the discrete cosine transforming unit 43 at a predetermined demodulation factor set by the amplitude modulation magnification generator 48 and the reciprocal calculator 49 to regenerate a prediction error signal.

The selector 50-1 as a fourth switching means selectively switches to either a prediction error signal regenerated by the inverse discrete cosine transforming unit 50-1 or a prediction error signal having been undergone amplitude demodulation by the amplitude demodulation multiplier 44, and outputs it to the adder 45.

The adder 45 has a function as a decoded image generating means for adding the prediction error signal regenerated by the amplitude demodulation multiplier 44 to a predicted image generated from a past inputted image to generate a decoded image.

The frame storage as a decoded image storing means stores a decoded image from the adder 45 for one frame or plural frames as a decoded image having been decoded in the past. The predicted image generating unit 47 has a function as a predicted image generating means for generating a predicted image from the control information regenerated by the variable length decoder 41 and the decoded image stored in the frame storage 46.

The selector 50-2 has a function as a fifth switching means for selectively switching to either the predicted image generated by the predicted image generating unit 47 or a signal ('0') representing that there is no predicted image, and outputs it to the adder 45.

The amplitude modulation magnification generator 48 generates an amplitude modulation magnification (an amplitude modulation function) similarly to that in the above-mentioned moving image coding apparatus 36 (refer to reference numeral 33 ).

The reciprocal calculator 49 computes a reciprocal of an amplitude modulation magnification from the amplitude modulation magnification generator 48 to generate a demodulation factor of the amplitude demodulation multiplier 44 similarly to that in the moving image coding apparatus (refer to reference numeral 34 ).

In other words, the above-mentioned amplitude modulation magnification generator and reciprocal calculator 49 have a function as a demodulation factor setting means for setting a demodulation factor in the amplitude demodulation multiplier 44 so as to optimally regenerate a prediction error signal before modulation.

In concrete, the amplitude modulation magnification generator 48 and the reciprocal calculator 49 set a magnification relatively decreasing a value of a modulated prediction error signal to a pixel at which an error generated as a result of coding in a block is desired to be small, while setting a magnification relatively increasing a value of a modulated prediction error signal to a pixel at which an error generated as a result of coding in a block can be permitted even if the error is large.

A modulation factor of a prediction error signal set by the above amplitude modulation magnification generator 48 and reciprocal calculator 49 is determined on a scale reflecting the human visual sensitivity (a scale representing how prominent an error is to men when the error is applied to the neighbourhood of the pixel of an image) in an image within a block on the basis of a predicted image from the predicted image generating unit 47.

Namely, the amplitude modulation magnification generator 48 and the reciprocal calculator 49 set a magnification relatively decreasing a value of a prediction error signal as a modulation factor to a pixel which is judged on the above scale as a pixel at which an error is apt to be prominent, while setting a magnification relatively increasing a value of a prediction error signal to a pixel which is judged on the above scale as a pixel at which an error is apt to be inconspicuous.

As the above scale as to whether an error is prominent or not, local dispersion of an image, functions such as a Potential Visibility Function (potential error visibility) and the like, or a relation between visibility of an error and a luminance, and the like may be, for example, used similarly to the above-mentioned moving image coding apparatus 36.

Further, the amplitude modulation magnification generator 46 may determine the above-mentioned scale reflecting the human visual sensitivity on the basis of a predicted image from the predicted image generating unit 31.

A predicted image used in conducting moving image coding highly correlates with a coded image. If a predicted image is used as a scale of error visibility in the similar algorithm in both the coding apparatus and the decoding apparatus, the amplitude modulation magnification generator 48 may adaptively determine a function used to transform an amplitude of the prediction error signal similarly to that in the above-mentioned moving image coding apparatus 36 (refer to reference character 33) (refer to FIGS. 4 through 7).

With the above structure, the moving image decoding apparatus according to the embodiment of this invention regenerates moving image coded information from the moving image coding apparatus 36 as follows.

The variable length decoder 41 is inputted thereto operation mode information (intraframe coding/interframe coding) according to a result of calculation of a prediction parameter for each block from the moving image coding apparatus 36 to control switching of the selectors 32-1 through 32-3 on the basis of the operation mode information.

The variable length decoder 41 decodes a quantized transform coefficient and control information constituting the moving image coded information having been undergone amplitude modulation from the moving image coding apparatus 36 in a block judged as interframe coding to regenerate them.

Following that, the dequantizer 42 dequantizes the regenerated quantized transform coefficient on the basis of information as to quantization as the control information from the moving image coding apparatus 36 to regenerate a transform coefficient.

Further, the inverse discrete cosine transforming unit 43 regenerates a modulated prediction error signal on the basis of the regenerated transform coefficient. The amplitude demodulation multiplier 44, after that, demodulates an amplitude of each pixel of the prediction error signal having been undergone amplitude modulation at the modulating factor calculated by the amplitude modulation magnification generator 48 and the reciprocal calculator 49, thereby regenerating a prediction error signal.

Meanwhile, the amplitude modulation magnification generator 48 and the reciprocal calculator 49 adaptively determine a function used to transform an amplitude of the prediction error signal as the modulation factor using a scale reflecting the human visual sensitivity similarly to those (refer to reference numerals 33 and 34) in the above-mentioned moving image coding apparatus 36.

The adder 45 adds the regenerated prediction error signal to a predicted image generated from a past inputted image in the predicted image generator 47 to regenerate a decoded image, and outputs it.

The frame storage 46 retains the decoded image decoded by the adder 45 as a past inputted image used when moving image coded information is conducted in the next stage.

The predicted image generating unit 47 can thereby generate a predicted image on the basis of a past inputted image from the frame storage 46 and a motion vector as a prediction parameter from the variable length decoder 41 similarly to the predicted image generating unit 31 in the above-mentioned moving image coding apparatus 36.

The amplitude demodulation multiplier 44 conducts amplitude demodulation on a result of inverse discrete cosine transformation, whereby an error visually prominent may be decreased as shown in FIGS. 7(*a*) through 7 (*h*), in concrete.

The variable length decoder 41 does not conduct amplitude demodulation on a prediction error signal in a block judged as intra (intraframe coding) by controlling switching of the selectors 50-1 and 50-2.

In the moving image decoding apparatus according to the embodiment of this invention, the amplitude demodulation multiplier 44 can decode an amplitude of each pixel of a modulated prediction error signal from the inverse discrete cosine transforming unit 43 at a predetermined modulation factor. It is therefore possible to regenerate a fine image in which visually prominent errors have been decreased over an entire block when a moving image having been modulated in coding is received. This feature can contribute to improvement in performance of the apparatus.

Further, the amplitude modulation magnification generator 48 and the reciprocal calculator 49 can generate a demodulation factor of the amplitude demodulation multiplier 44 such as to optimally regenerate a prediction error signal before modulation. It is therefore possible to generate a decoded image highly accurate using the regenerated prediction error signal. This feature can improve an accuracy of decoding of an image having been undergone prediction coding.

The amplitude modulation magnification generator 48 and the reciprocal calculator 49 can adaptively set a magnification as a demodulation factor of the amplitude demodulation multiplier 44 depending on whether a pixel at which an error generated as a result of coding is desired to be decreased or a pixel at which an error generated as a block coding can be permitted even if the error is large. It is therefore possible to adaptively judge a part in which an error is visually prominent to suppress a coding error in that portion while keeping a compression efficiency when an image is decoded and regenerated.

A modulation factor of a prediction error signal set by the amplitude modulation magnification generator 48 and the reciprocal calculator 49 can be determined on the basis of a scale reflecting the human visual sensitivity in an image within a block. It is therefore possible to adaptively judge a pixel which is apt to be seen as an error by men to regenerate an image which is difficult to be judged as an error by men.

Owing to the selectors 50-1 and 50-2 and the variable length decoder 41, it is possible to adaptively select a mode of either intraframe coding or interframe coding according to a block on the basis of a prediction parameter as the control information. In consequence, efficient coding according to a block becomes feasible.

According to this invention, an inputted image is divided into, at least, blocks each consisting of plural pixels, a difference between the inputted image and a predicted image generated from a past inputted image for each block is computed to generate a prediction error signal, an amplitude of each pixel of the prediction error signal is undergone amplitude modulation at a predetermined modulation factor, the prediction error signal undergone amplitude modulation is transformed in order to remove correlation among the pixels to generate a transform coefficient, the generated transform coefficient is quantized, and a code is assigned to the quantized transform coefficient, then the code is outputted. This invention enables a coding process which can decrease an error in a portion which is visually prominent over en entire block so as to transmit a visually fine image.

According to this invention, at least, a value of a prediction error signal of a pixel at which an error generated as a result of coding in a block is desired to be decreased is modulated at a relatively large magnification, whereas a value of a prediction error signal of a pixel at which an error generated as a result of block coding can be permitted if the error is large is modulated at a relatively small magnification. It is therefore possible to adaptively judge a portion in which an error is visually prominent to suppress a coding error in that portion while keeping a compression efficiency.

According to this invention, at least, a quantized transform coefficient and control information constituting moving image coded information having been undergone amplitude modulation from the moving image coding apparatus are decoded and regenerated, the regenerated quantized transform coefficient is dequantized to regenerate a transform coefficient, a modulated prediction error signal is regenerated on the basis of the regenerated transform coefficient, an amplitude of each pixel of the prediction error signal having been undergone amplitude modulation is decoded at a predetermined demodulation factor to regenerate a prediction error signal, and the regenerated prediction error signal is added to a predicted image generated from a past inputted image to generate a decoded image. It is therefore possible to regenerate a fine image in which visually prominent errors have been decreased over an entire block when a moving image having been undergone modulation upon coding is received.

According to this invention, at least, a value of a modulated prediction error signal of a pixel at which an error generated as a result of coding in a block is desired to be decreased is demodulated at a relatively small magnification, whereas a value of a modulated prediction error signal of a pixel at which an error generated as a result of coding of a block can be permitted even if the error is large is demodulated at a relatively large magnification. It is therefore possible to adaptively judge a portion in which an error is visually prominent to suppress a coding error in that portion while keeping a compression efficiency when an image is decoded to be regenerated.

(d) Others

In the above embodiment, the moving image coding apparatus 36 and the moving image decoding apparatus 51 have been described. However, it is possible to integrate the moving image coding apparatus 36 and the moving image decoding apparatus 51 to constitute a moving image coding-decoding apparatus having functions of both the coding apparatus and the decoding apparatus as described above.

In the above embodiment, a modulation factor in the amplitude modulation multiplier 22 and the demodulation factor of the amplitude demodulation multipliers 27 and 44 are set by the amplitude modulation magnification generators 33 and 48 and the reciprocal calculators 34 and 49. According to this invention, it is alternatively possible to set a modulation factor and a demodulation factor according to a pixel at which an error is desired to be decreased or a pixel at which an error can be permitted even if the error is large in a manner other than the above manner.

In the above embodiment, complexity and luminance of an image is used as a scale representing visibility of error. However, this invention is not limited to this example, but it is possible to use a scale other than the above so long as it basically represents local error visibility of a pixel.

What is claimed is:

1. A moving image coding apparatus comprising:

a prediction error signal generating means for dividing an inputted image into blocks each consisting of plural pixels, and computing a difference between the inputted image and a predicted image generated from a past inputted image for each block to generate a prediction error signal;

an amplitude modulating means for conduction amplitude modulation on an amplitude of each pixel of the prediction error signal generated by said prediction error signal generating means at a predetermined modulation factor;

a transforming means for transforming the prediction error signal having been undergone the amplitude modulation in said amplitude modulating means in order to remove correlation among the pixels to generate a transform coefficient;

a quantizing means for quantizing the transform coefficient from said transforming means;

a dequantizing means for dequantizing a quantized transform coefficient from said quantizing means to regenerate the transform coefficient;

an inverse transforming means for regenerating the prediction error signal having been undergone the amplitude modulation on the basis of said regenerated transform coefficient;

an amplitude demodulating means for demodulating an amplitude of each pixel of the prediction error signal from said inverse transforming means at a predetermined demodulation factor to regenerate the prediction error signal;

a decoded image generating means for adding the prediction error signal regenerated by said amplitude demodulating means to said predicted image to generate a decoded image;

a decoded image storing means for storing the decoded image from said decoded image generating means as a decoded image decoded in the past;

a prediction parameter calculating means calculating a prediction parameter used to generate said predicted image from the decoded image stored in said decoded image storing means such that an error between said decoded image and an inputted image inputted following said decoded image is decreased;

a predicted image generating means for generating said predicted image from the prediction parameter calculated by said prediction parameter calculating means and the decoded image stored in said decoded image storing means; and a channel coding means for assigning codes to control information along with the quantized transform coefficient from said quantizing means to output the codes as moving image coded information.

2. The moving image coding apparatus according to claim 1 further comprising a modulation factor setting means for setting a magnification relatively increasing a value of said prediction error signal to a pixel at which an error generated as a result of coding in said block is desired to be decreased as a modulation factor of said amplitude modulating means, while setting a magnification factor relatively decreasing said prediction error signal to a pixel at which an error generated as a result of coding in said block can be permitted even if the error is large as the modulation factor of said amplitude modulating means.

3. The moving image coding apparatus according to claim 2, wherein the modulation factor for the prediction error signal set by said modulation factor setting means is determined in an image within said block on the basis of a scale reflecting the human visual sensitivity.

4. The moving image coding apparatus according to claim 3, wherein said modulation factor setting means sets as the modulation factor for the prediction error signal in said amplitude modulating means a relatively larger magnification to a value of said prediction error signal of an pixel which is judged that an error at which is more prominent on said scale, while setting a relatively smaller magnification to a value of said prediction error signal of a pixel which is judged that an error at which is less prominent on said scale.

5. The moving image coding apparatus according to claim 3, wherein said modulation factor setting means determines said scale on the basis of the predicted image from said predicted image generating means.

6. The moving image coding apparatus according to claim 1 further comprising a demodulation factor setting means for setting a demodulation factor in said amplitude demodulating means such that the prediction error signal before modulation in said amplitude modulating means may be optimally regenerated.

7. The moving image coding apparatus according to claim 6, wherein said demodulation factor setting means sets said demodulation factor on the basis of the modulation factor of said amplitude modulating means set by said modulation factor setting means.

8. The moving image coding apparatus according to claim 1, wherein said control information includes at least one among information as to quantization, a prediction parameter and information as to modulation by said amplitude modulating means.

9. A moving image coding apparatus comprising:

a prediction error signal generating means for dividing an inputted image into blocks each consisting of plural pixels, and computing a difference between the inputted image and a predicted image generated from a past inputted image for each block to generate a prediction error signal;

an amplitude modulating means for conducting amplitude modulation on an amplitude of each pixel of the prediction error signal generated by said prediction error signal generating means at a predetermined modulation factor;

a first switching means for selectively switching to either the prediction error signal from said prediction error signal generating means or the prediction error signal having been undergone the amplitude modulation by said amplitude modulating means and outputting it;

a transforming means for transforming the prediction error signal from said first switching means in order to remove correlation among the pixels to generate a transform coefficient;

a quantizing means for quantizing the transform coefficient from said transforming means;

a dequantizing means for dequantizing the quantized transform coefficient from said quantizing means to regenerate the transform coefficient;

an inverse transforming means for regenerating the prediction error signal having been undergone the amplitude modulation on the basis of said regenerated transform coefficient;

an amplitude demodulating means for demodulating an amplitude of each pixel of the prediction error signal from said inverse transforming means at a predetermined demodulation factor to regenerate the prediction error signal;

a second switching means for selectively switching to either the prediction error signal regenerated by said inverse transforming means or the prediction error signal having been undergone the amplitude demodulation by said amplitude demodulating means and outputting it;

a decoded image generating means for adding the prediction error signal from said second switching means to said predicted image to generate a decoded image;

a decoded image storing means for storing the decoded image from said decoded image generating means as a decoded image decoded in the past;

a prediction parameter calculating means for calculating a prediction parameter used to generate said predicted image from the decoded image stored in said decoded image storing means such that an error between said decoded image and an inputted image inputted following said decoded image is decreased;

a predicted image generating means for generating said predicted image from the prediction parameter calculated by said prediction parameter calculating means and the decoded image stored in said decoded image storing means to generate said predicted image;

a channel coding means for assigning codes to control information along with the quantized transform coefficient from said quantizing means and outputting them as moving image coded information;

a third switching means for selectively switching to either the predicted image generated by said predicted image generating means or a signal representing that there is no predicted image and outputting it to said prediction error signal generating means and said decoded image generating means; and a first control means for controlling switching of each of said switching means according to said block.

10. The moving image coding apparatus according to claim 9, wherein said first control means controls switching of each of said switching means on the basis of the prediction parameter calculated by said prediction parameter calculating means.

11. A moving image decoding apparatus comprising:

a channel code decoding means for decoding quantized transform coefficient and control information constituting moving image coded information from a moving image coding apparatus to regenerate them;

a dequantizing means for dequantizing the quantized transform coefficient regenerated by said channel code decoding means to regenerate a transform coefficient;

an inverse transforming means for regenerating a prediction error signal having been undergone amplitude modulation on the basis of said regenerated transform coefficient;

an amplitude demodulating means for demodulating an amplitude of each pixel of the modulated prediction error signal from said inverse transforming means at a predetermined demodulation factor to regenerate a prediction error signal;

a decoded image generating means for adding the prediction error signal regenerated by said amplitude demodulating means to a predicted image generated from a past inputted image to generate a decoded image;

a decoded image storing means for storing the decoded image from said decoded image generating means as a decoded image decoded in the past; and a predicted image generating means for generating said predicted image from the control information regenerated by said channel code decoding means and the decoded image stored in said decoded image storing means.

12. The moving image decoding apparatus according to claim 11 further comprising a demodulation factor setting means for setting a demodulation factor in said amplitude demodulating means such that the prediction error signal before modulation may be optimally regenerated.

13. The moving image decoding apparatus according to claim 12, wherein said demodulation factor setting means sets as the demodulating factor a magnification relatively decreasing a value of said modulated prediction error signal to a pixel at which an error generated as a result of coding in said block is desired to be decreased, while setting as the demodulation factor a magnification relatively increasing a value of said modulated prediction error signal to a pixel at which an error generated as a result of coding in said block can be permitted even if the error is large.

14. The moving image decoding apparatus according to claim 13, wherein the demodulation factor for the predicted error signal set by said demodulation factor setting means is determined in an image in said block on the basis of a scale reflecting the human visual sensitivity.

15. The moving image decoding apparatus according to claim 14, wherein said demodulation factor setting means sets as said demodulation factor a magnification relatively decreasing a value of said prediction error signal to a pixel which is judged that an error at which is apt to be prominent on said scale, while setting as said demodulation factor a magnification relatively increasing a value of said prediction error signal to a pixel which is judged that an error at which is apt to be inconspicuous on said scale.

16. The moving image decoding apparatus according to claim 14, wherein said demodulation factor setting means determines said scale on the basis of the predicted image from said predicted image generating means.

17. The moving image decoding apparatus according to claim 11, wherein the control information from said moving image coding apparatus includes at least one among information as to quantization, a prediction parameter and information as to modulation.

18. A moving image decoding apparatus comprising:

a channel code decoding means for decoding quantized transform coefficient and control information constituting moving image coded information from a moving image coding apparatus to regenerate them;

a dequantizing means for dequantizing the quantized transform coefficient regenerated by said channel code decoding means to regenerate a transform coefficient;

an inverse transforming means for regenerating a prediction error signal having been undergone amplitude modulation on the basis of said regenerated transform coefficient;

an amplitude demodulating means for demodulating an amplitude of each pixel of the modulated prediction error signal from said inverse transforming means at a predetermined demodulation factor to regenerate a prediction error signal;

a fourth switching means for selectively switching to either the prediction error signal regenerated by said inverse transforming means or the prediction error signal having been undergone amplitude demodulation by said amplitude demodulating means and outputting it;

a decoded image generating means for adding the predicted error signal from said fourth switching means to a predicted image generated from a past inputted image to generate a decoded image;

a decoded image storing means for storing the decoded image from said decoded image generating means as a decoded image decoded in the past;

a predicted image generating means for generating said predicted image from the control information regenerated by said channel code decoding means and the decoded image stored in said decoded image storing means;

a fifth switching means for selectively switching to either the predicted image generated by said predicted image generating means or a signal representing that there is no predicted image and outputting it to said decoded image generating means; and a second control means for controlling switching of each of said switching means according to said block.

19. The moving image decoding apparatus according to claim 18, wherein the control information regenerated by said channel code decoding means is configured with a prediction parameter, whereas said second control means controls switching of said fourth switching means and said fifth switching means on the basis of said prediction parameter.

20. A moving image coding-decoding apparatus comprising:

a moving image coding unit comprising:

a prediction error signal generating means for dividing an inputted image into blocks each consisting of plural pixels, and computing a difference between the inputted image and a predicted image generated from a past inputted image for each block to generate a prediction error signal;

an amplitude modulating means for conducting amplitude modulation on an amplitude of each pixel of the prediction error signal generated by said prediction error signal generating means at a predetermined modulation factor;

a transforming means for transforming the prediction error signal having been undergone the amplitude modulation in said amplitude modulating means in order to remove correlation among the pixels to generate a transform coefficient;

a quantizing means for quantizing the transform coefficient from said transforming means;

a dequantizing means for dequantizing the quantized transform coefficient from said quantizing means to regenerate the transform coefficient;

an inverse transforming means for regenerating the predicted error signal having been undergone the amplitude modulation on the basis of said regenerated transform coefficient;

an amplitude demodulating means for demodulating an amplitude of each pixel of the prediction error signal form said inverse transforming means at a predetermined demodulation factor to regenerate the prediction error signal;

a decoded image generating means for adding the prediction error signal regenerated by said amplitude demodulating means to said predicted image to generate a decoded image;

a decoded image storing means for storing the decoded image from said decoded image generating means as a decoded image decoded in the past;

a prediction parameter calculating means for calculating a prediction parameter used to generate said predicted image from the decoded image stored in said decoded image storing means such that an error between the decoded image and an inputted image inputted following said decoded image is decreased;

a predicted image generating means for generating said predicted image from the prediction parameter calculated by said prediction parameter calculating means and the decoded image stored in said decoded image storing means;

a channel coding means for assigning codes to control information along with the quantized transform coefficient from said quantizing means to output the codes as moving image coded information;

a moving image decoding unit comprising:

a channel code decoding means for decoding a quantized transform coefficient and control information constituting moving image coded information from a moving image coding apparatus to regenerate them;

a dequantizing means for dequantizing the quantized transform coefficient regenerated by said channel code decoding means to regenerate a transform coefficient;

an inverse transforming means for regenerating the prediction error signal having been undergone the amplitude modulation on the basis of said regenerated transform coefficient;

an amplitude demodulating means for demodulating an amplitude of each pixel of the modulated prediction error signal from said inverse transforming means at a predetermined demodulation factor to regenerate the prediction error signal;

a decoded image generating means for adding the prediction error signal regenerated by said amplitude demodulating means to a predicted image generated from a past inputted image to generate a decoded image;

a decoded image storing means for storing the decoded image from said decoded image generating means as a decoded image decoded in the past; and a predicted image generating means for generating said predicted image from the control information regenerated by said channel code decoding means and the decoded image stored in said decoded image storing means.

* * * * *

UNITED STATES PATENT AND TRADEMARK OFFICE
CERTIFICATE OF CORRECTION

PATENT NO. : 5,838,378

DATED : November 17, 1998

INVENTOR(S) : NAKAGAWA et al.

It is certified that error appears in the above-identified patent and that said Letters Patent is hereby corrected as shown below:

On the title page, Item [54], and Column 1, line 3,

"MOVING CODING-DECODING" should be --MOVING IMAGE CODING-DECODING--.

Signed and Sealed this

Fifteenth Day of June, 1999

*Attest:*

Q. TODD DICKINSON

*Attesting Officer*     Acting Commissioner of Patents and Trademarks